(12) United States Patent
Gehring et al.

(10) Patent No.: US 6,870,670 B2
(45) Date of Patent: Mar. 22, 2005

(54) SCREENS AND METHODS FOR DISPLAYING INFORMATION

(75) Inventors: Thomas R. Gehring, Mahtomedi, MN (US); Michael L. Graetz, Stillwater, MN (US); Andrew J. Piepel, Hudson, WI (US); Mark L. Schuleman, Mendota Heights, MN (US); Kenneth L. Yarina, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 460 days.

(21) Appl. No.: 09/827,774

(22) Filed: Apr. 6, 2001

(65) Prior Publication Data

US 2002/0163722 A1 Nov. 7, 2002

(51) Int. Cl.$^7$ .............................................. G03B 21/56
(52) U.S. Cl. ...................................... 359/443; 359/460
(58) Field of Search ............................... 359/443, 452, 359/453, 460, 461

(56) References Cited

U.S. PATENT DOCUMENTS

| | | | | |
|---|---|---|---|---|
| 2,378,252 A | | 6/1945 | Staehle et al. ............. | 88/28.93 |
| 3,510,197 A | * | 5/1970 | Seki et al. .................. | 359/461 |
| 3,691,140 A | | 9/1972 | Silver ........................ | 260/78.5 |

(List continued on next page.)

FOREIGN PATENT DOCUMENTS

| | | |
|---|---|---|
| DE | 19843902 | 4/1999 |
| EP | 0 570 515 | 6/1996 |
| EP | 0752613 A | 1/1997 |
| EP | 0 783 133 | 7/1997 |
| EP | 0 736 585 | 9/1999 |
| JP | 63-134227 | 6/1988 |
| JP | 64-86102 | 3/1989 |
| JP | 05173250 | 7/1993 |
| JP | 2000187279 | 7/2000 |
| WO | WO94/21742 | 9/1994 |
| WO | WO95/06692 | 3/1995 |
| WO | WO97/01610 | 1/1997 |
| WO | WO98/39157 | 9/1998 |
| WO | WO98/39759 | 9/1998 |
| WO | WO98/45753 | 10/1998 |
| WO | WO99/13378 | 3/1999 |
| WO | WO99/50710 | 10/1999 |
| WO | WO99/64927 | 12/1999 |
| WO | WO99/65999 | 12/1999 |
| WO | WO00/56556 | 9/2000 |

OTHER PUBLICATIONS

Emil C. Neu, Lecturing with a Notebook Computer, 1998, Int. J. Engng Ed. vol. 14, No. 2, p. 119–121.*
3M Product Bulletin 280, Scotchlite Reflective Sheeting Series 280, Jan. 1999, p. 1–4.*
3M Product Bulletin 1170, Scotchlite Electronic Cuttable (E.C.) Film Series 1170, Mar. 1995, p. 1–4.*
Product Literature from Navori.net.
Hitachi Product Literature.
DNP product literature.
U.S. Appl. No. 09/823,025, filed Mar. 30, 2001, Stevenson et al.
U.S. Appl. No. 09/827,773, filed Apr. 6, 2001, Piepel et al.
U.S. Appl. No. 09/717,598, filed Nov. 21, 2000, Piepel et al.
U.S. Appl. No. 09/560,267, filed Apr. 26, 2000, Piepel et al.

*Primary Examiner*—Christopher Mahoney
(74) *Attorney, Agent, or Firm*—Stephen W. Buckingham

(57) ABSTRACT

A flexible screen with a mechanism for releasably attaching the screen to a transparent door or window is disclosed. A method of use is also disclosed.

40 Claims, 13 Drawing Sheets

U.S. PATENT DOCUMENTS

| | | | | |
|---|---|---|---|---|
| 3,712,707 A | | 1/1973 | Henkes, Jr. | 350/122 |
| 3,754,813 A | * | 8/1973 | Depalma et al. | 359/452 |
| 3,872,032 A | | 3/1975 | Kanemaru et al. | 260/2 H |
| 3,942,868 A | * | 3/1976 | Hoffbauer et al. | 359/461 |
| 4,095,013 A | | 6/1978 | Burger | 428/522 |
| 4,166,152 A | | 8/1979 | Baker et al. | 428/522 |
| 4,323,301 A | | 4/1982 | Spector | 350/117 |
| 4,379,617 A | | 4/1983 | Funakoshi et al. | 350/126 |
| 4,418,986 A | | 12/1983 | Yata et al. | 350/128 |
| 4,468,092 A | | 8/1984 | Inoue et al. | 350/128 |
| 4,509,823 A | | 4/1985 | Moriguchi et al. | 350/128 |
| 4,576,850 A | | 3/1986 | Martens | 428/156 |
| 4,739,567 A | * | 4/1988 | Cardin | 359/460 |
| 4,875,259 A | | 10/1989 | Appeldorn | 24/576 |
| 4,896,953 A | | 1/1990 | Cobb, Jr. | 350/452 |
| 4,968,562 A | | 11/1990 | Delgado | 428/402 |
| 4,994,322 A | | 2/1991 | Delgado et al. | 428/343 |
| 4,999,937 A | | 3/1991 | Bechtold | 40/610 |
| 5,010,671 A | | 4/1991 | Stonehouse | 40/594 |
| 5,141,790 A | | 8/1992 | Calhoun et al. | 428/40 |
| 5,183,597 A | | 2/1993 | Lu | 264/1.4 |
| 5,196,266 A | | 3/1993 | Lu et al. | 428/355 |
| 5,201,101 A | | 4/1993 | Rouser et al. | 24/575 |
| 5,296,277 A | | 3/1994 | Wilson et al. | 428/40 |
| 5,316,849 A | | 5/1994 | Lu et al. | 428/355 |
| 5,362,516 A | | 11/1994 | Wilson et al. | 427/207.1 |
| 5,563,738 A | | 10/1996 | Vance | 359/614 |
| 5,781,344 A | | 7/1998 | Vance | 359/614 |
| 5,794,207 A | | 8/1998 | Walker et al. | 705/23 |
| 5,794,210 A | | 8/1998 | Goldhaber et al. | 705/14 |
| 5,899,010 A | | 5/1999 | Peck | 40/618 |
| 5,926,796 A | | 7/1999 | Walker et al. | 705/16 |
| 5,960,411 A | | 9/1999 | Hartman et al. | 705/26 |
| 6,013,722 A | | 1/2000 | Yang et al. | 524/558 |
| 6,030,002 A | | 2/2000 | Charley et al. | 283/81 |
| 6,163,402 A | | 12/2000 | Chou et al. | 359/443 |
| 6,171,681 B1 | | 1/2001 | Mascarenhas et al. | 428/141 |
| 6,197,397 B1 | | 3/2001 | Sher et al. | 428/42.3 |
| 6,204,971 B1 | | 3/2001 | Morris et al. | 359/619 |
| 6,337,769 B1 | * | 1/2002 | Lee | 359/460 |
| 6,744,558 B2 | * | 6/2004 | Tanaka et al. | 359/460 |

* cited by examiner

SCREENS AND METHODS FOR DISPLAYING INFORMATION

FIELD

This invention relates generally to optical systems for temporarily providing information and more particularly to flexible, transmissive screens with high ambient light rejection for use in rear projection systems.

BACKGROUND

Rear projection screens transmit an image projected onto the rear of the screen into a viewing space. A rear projection screen may be a sheetlike optical device with a relatively thin viewing layer that is placed at an image surface of the projector. Examples of rear projection displays are disclosed in PCT WO 99/064927, PCT WO 99/13378 and EP 783 133.

Projection screens are often constructed of rigid materials such as glass or a semi-rigid, transparent polymeric material. As a result, it is not possible to conveniently roll an inflexible projection screen in the fashion that a diploma or map may be rolled as it will damage the screen. Examples of a typical prior art rigid projection screens comprise the DA series of diffusion screens from DA-Lite. Rigid projection screens are described in U.S. Pat. No. 6,163,402.

Other rear projection optical systems may include a fresnel lens and/or a lenticular lens or sheet. Examples of such systems are disclosed in U.S. Pat. Nos. 3,712,707; 3,872,032; 4,379,617; 4,418,986; 4,468,092 and 4,509,823.

Front projection systems are also known in the art. They comprise a projector designed to project an image on a surface (e.g. the wall of a conference room or a screen). Overhead projectors are an example of a front projection system. Rear projection screens provide several advantages over front projection screens. With a rear projection screen, the presenter cannot cast a shadow on the image and the projection equipment may be hidden from view (which also helps mask any acoustical background noise emanating from electrical components). Front projection systems have less capacity to absorb ambient light than rear projection systems.

One known rear projection screen comprises a thin, light diffusing layer (frosted or translucent glass) constructed by etching, sandblasting or otherwise roughening a smooth glass surface. Since the translucent surface scatters light, the image is viewable from a range of viewing angles. Screens that are merely translucent tend to strongly reflect ambient light incident on the front, viewing side, resulting in fading or washout of the projected image. As a result, this rear projection screen is sensitive to ambient lighting conditions.

U.S. Pat. No. 4,323,301 discloses a collapsible and portable screen assembly that is said to be able to act as a rear or front projection screen. The assembly includes an inflatable frame and a flexible sheet of screen material.

U.S. Pat. No. 2,378,252 discloses a rear projection screen comprising an array of closely packed glass beads associated with a transparent support and a light absorbing layer. The glass beads perform lens-like functions to collect light projected from the rear of the screen and focus it to relatively small spots near the area where the beads contact the support. The glass beads contact the transparent substrate and thereby exclude most of the light absorbing material at the contact area location between the glass beads and support. The light absorbing layer absorbs ambient light incident on the front surface of the support. As a result, the front side of the screen appears dark, except for the light transmitted through the glass beads.

Rear projection screens with glass beads are also disclosed in U.S. Pat. Nos. 5,563,738 and 5,781,344. Additional beaded screens and methods of making such screens are disclosed in commonly assigned patent applications PCT WO 99/50710 and PCT WO 98/45753.

Televisions are used for advertising in malls, showrooms and product exhibitions. Many televisions used for this type of advertising are permanently installed or very large and heavy and, as a result, are not portable.

Projection systems as opposed to televisions are also used for advertising in malls, showrooms, and exhibitions. Rear projection systems are one such example. They consist of at least a projection device (e.g. LCD) and a rear projection screen. Typically, the projector is installed on a floor or, alternatively, the ceiling. Installation of floor or ceiling mounted systems requires significant resources. Complicated or time consuming installation procedures contribute to the cost of the system. While rear projection systems are available that are self-contained units, such self-contained rear projection systems typically include bulky framework and housing elements that render the systems difficult to reposition. Rear projection systems with large screens also tend to be quite heavy, further contributing to difficulties associated with transporting and installing the optical system.

Another rear projection system is capable of providing holographic images. An example of such a screen is the dnp Holo Screen™ available from DAINIPPON PRINTING Co., Ltd. of Japan or its associated organization in Denmark. This system includes a thin hologram film laminated to a transparent acrylic plate. The hologram film consists of four holograms that are tiled together. The hologram film will only respond to light rear projected from thirty five degrees. This film is very selective about the direction from which it receives the light, thereby complicating installation. In a room with at least some ambient background lighting, this screen remains transparent where there is no projected image.

Other examples of a rear projection screen are the Hitachi On-Glass Projection System 40"/60" and the AirSho™ 40"/60" Display Projection System, both available from Hitachi of Brisbane Calif. A typical screen is constructed from a photopolymer resin that refracts light incident at the thirty five degree angle. A 0.3 $\mu$m to 2.0 $\mu$m pitch is applied to the screen. The screen is transparent and very expensive. A permanent adhesive is used to attach the screen to a store window. The screen lacks an efficient ambient light absorbing layer, hence it is susceptible to washout in brightly lit conditions. As a result, these screens require very bright (1700 ANSI Lumen and above) projectors. These bright projectors are expensive to purchase. They are also expensive to maintain due to short lamp lives.

A permanently installed optical system runs the risk of becoming commonplace. This is a problem as purchasing decisions are often made at the point of purchase. Over time, customers that frequent a particular location may take a permanently installed optical system for granted. A static display can lose its splendor and become less valuable.

SUMMARY

The present invention preferably comprises a high contrast, high resolution, flexible, rear projection screen along with a removable adhesive which can be mounted easily on a window or any other transparent surface to form an imaging surface for a rear projection display.

The invention comprises a method of displaying information to viewers comprising the steps of providing a projector capable of presenting an image, providing a flexible screen having a rear surface for receiving light from the projector, and a viewing surface opposite the rear surface. Preferably, the screen includes a light absorbing layer for rendering the screen substantially opaque in ambient lit conditions when no image is projected on the screen by the projector.

The method includes the step of associating the screen with a substantially transparent surface such as a window or door. For example, the method may include the step of providing a removable adhesive, a mechanical fastener, cling material or other means.

The method includes the step of selecting a substantially transparent surface in a position capable of being viewed, associating the screen on the substantially transparent surface, and projecting an image from the projector onto the rear surface of the screen to provide the information to the viewers.

Optionally, the method may comprise the steps of removing the screen from the substantially transparent surface after a time period, and adhering the screen to a different substantially transparent surface at a separate location, particularly when a reusable adhesive, cling material or mechanical fastener is used.

In another aspect, the present invention comprises a projection screen for use in an optical system having a projector that provides information to viewers, the projection screen comprising a flexible light transmitting substrate, light absorbing means associated with the light transmitting substrate for controlling ambient light rejection so that the screen appears substantially dark in ambient lit conditions when no light is projected on the screen from the projector, and a removable adhesive associated with the screen to releasably adhere the screen in a position associated with a substantially transparent surface so that viewers may view the screen through the substantially transparent surface.

Alternatively, the screen may include a mechanical fastener or cling material. Screens without light absorbing layers are also contemplated in particular aspects of the invention. Preferably, the screen may be readily manually cut to customize the shape of the screen. Optionally, the screen may include a substantially opaque border.

BRIEF DESCRIPTION OR THE DRAWINGS

The invention may be more completely understood in the following detailed description of various embodiment of the invention in connection with the accompanying drawings, in which.

Figure 1:
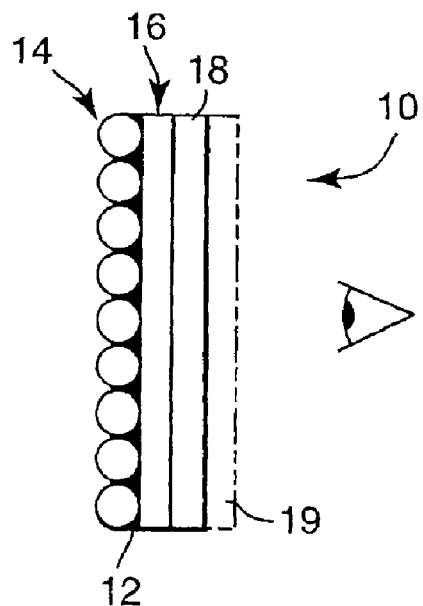
FIG. 1 is a schematic side view of a first embodiment of a rear projection screen according to an aspect of the present invention.

The invention is amenable to various modifications and alternative forms. Specifics of the invention are shown in the drawings by way of example only. The intention is not to limit the invention to the particular embodiments described. Instead, the intention is to cover all modifications, equivalents, and alternatives falling within the spirit and scope of the invention as defined in the claims.

DETAILED DESCRIPTION

Figure 5:
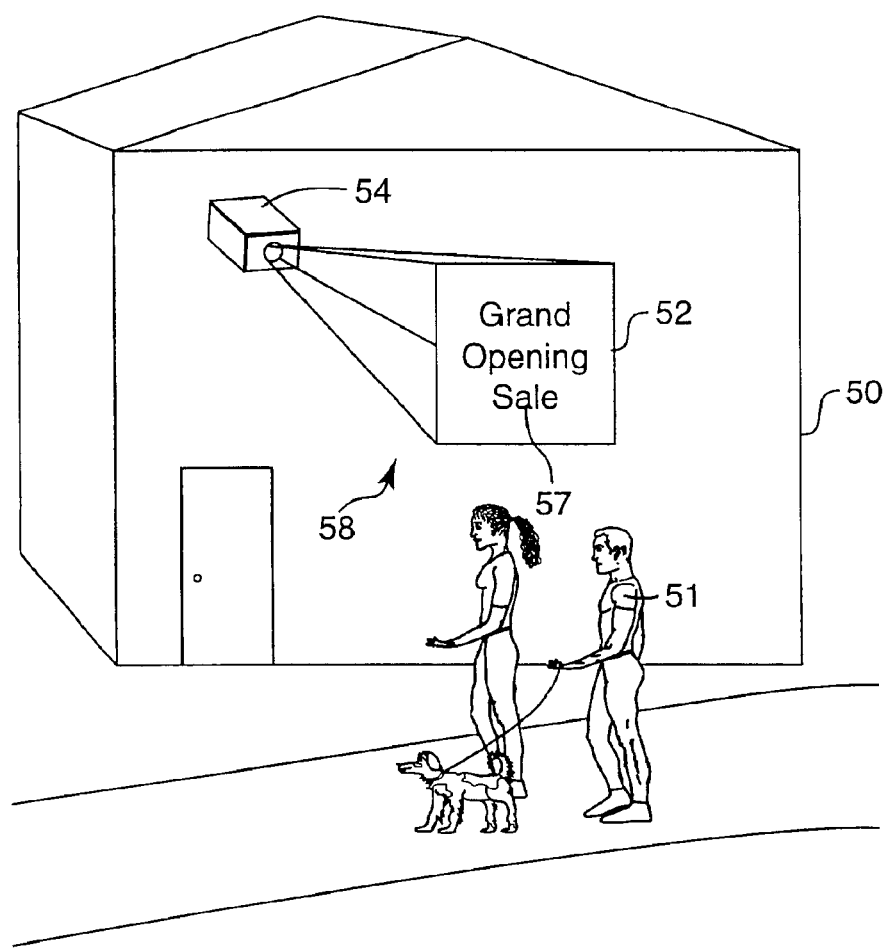
FIG. 5 is a schematic view showing a system for providing information to potential customers according to an aspect of the present invention.

Referring to FIG. 5, there is shown an optical system for displaying information 57 to viewers 51 according to the present invention. The viewers 51 may be an audience, spectators, pedestrians, potential customers, drivers, passengers, students, patrons or listeners. The information can warn, entertain, offer, educate, advertise, publicize, announce, promote, inform or otherwise communicate information.

The optical system 58 includes a screen 52 and projector 54. The projector 54 presents information 57, such as an image, to a viewer such as a potential customer 51. The image may be any suitable form of information such as data, video or graphics.

The information 57 provided to the customer may comprise a wide variety of information useful to communicate to a viewer such as a potential customer. The information may comprise promotional, advertising, price, publicity, performance, specifications, feature, offer, warranty, rebate, or instructional information, or combinations thereof. This list is intended to be illustrative and not exhaustive. The present invention is particularly suitable for use with information associated with impermanent events (as opposed to permanent events), special events (e.g. a farewell tour of a popular rock band), highly publicized marketing or promotional campaigns, high profile proceedings, advertising intended to briefly hype goods or services, fleeting sales or specials, and other transitory events.

The screen 52 preferably is a flexible, rear projection screen having a rear surface for receiving light from the projector 54, and a viewing surface opposite the rear surface. As used herein, when it is said that the screen 52 is flexible, it is meant that the screen may be conveniently rolled in a cylindrical fashion without damaging the screen. By "cylindrical fashion", it is meant a manner that is similar to the way that maps, posters or diplomas are commonly rolled.

Projection screens are susceptible to loss of image contrast due to ambient light incident on the screen. Such ambient light effects can be suppressed by various means, including the use of refractive elements surrounded by an opaque, typically black, matrix of material. In screens of this type, the viewing angle can be varied by varying the refractive index of the refractive elements of the screen.

As used herein, the viewing angle means the angle at which gain is reduced by 50% of the peak value. To determine viewing angle, screen gain is tested. Gain is a measure of screen brightness and a function of viewing angle. It is normalized with respect to a Lambertian diffuser. To measure gain, a white light source illuminates a white reflectance standard. Its luminance is measured with a luminance meter at near normal incidence ($L_R$). A screen is placed in front of the light source and the luminance is measured (on the opposite side of the sample from the source) at near normal incidence ($L_S$). The peak gain is defined as the ratio of $L_S/L_R$.

After the on-axis gain measurement, the screen then stepped through a range of angles, a luminance reading taken at each position. $L_{S-\theta}/L_R$ (Gain) is then plotted as a function of angle. The viewing angle is defined as the angle at which the gain falls to one-half its peak value.

When beaded rear projection screens are used for displays, it has been found that in some situations, a wider viewing angle is desired, while in other situations, a narrower viewing angle may be preferred. Lower refractive indices for the beads tend to narrow the viewing angle, but provide a brighter image to viewers located within the area defined by the maximum viewing angle. For this reason, it is useful to be able to provide a variety of different screens for different situations. Use of different beads for different screens affords this flexibility in screen design.

Public information displays are often changed, or removed completely, at relatively frequent intervals. As a result, components of such displays need to be stored for later use, or discarded and replaced at a later time. Since storage space is limited, and optical display components are subject to damage during handling and storage, it is desirable to be able to store such items in a compact and protected manner. In a preferred embodiment, screens according to the present invention are flexible. The flexible screens can be rolled up into relatively tight rolls, typically rolls of 6" or smaller inside diameter, so that they can be placed, for example, in protective tubes.

More preferably, the flexible screen 52 is conformable. As used herein, when it is said that the screen is conformable, it is meant that the screen readily changes shape to correspond to substantially the shape of a substrate with an uneven, irregular or slightly curved surface.

The screen 52 should be suitable for use with the projector 54. A wide variety of projectors may be used with a screen in the invention, including LCD projectors, CRT, Digital Light Processing Projectors (DLP projectors), D-ILA projectors, and plasma projectors. Specific examples of suitable projectors include Digital Light Processing Projectors available from Texas Instruments DLP Technologies, Barco Projection Systems, Epson, Hitachi, JVC, Kodak, NEC, Panasonic, Philips, Polaroid, Sanyo, Sharp, Sony, and Toshiba. Specific model numbers include a Barco 6000 Series video projector, a Panasonic PT-D 9500 DLP-projector (capable of providing 10,000 ANSI lumens) and a Toshiba LCD Data Projector, number TLP 710. It is also contemplated that an overhead projector may be used in some aspects of the invention.

A means is provided to associate the screen 52 with a substantially transparent viewable surface of the location 50. The means may comprise an adhesive. The screen 52 preferably includes a removable adhesive on the viewing surface of the screen 52 although many other embodiments of such means are described and contemplated herein. The adhesive is designed to adhere the screen to or adjacent the substantially transparent surface (e.g. a window, wall, windshield, partition, table or door) so that the potential customer 51 may look through the window and see the screen 52.

The adhesive is preferably an optical adhesive. As used herein, the phrase "optical adhesive" means an adhesive that allows a viewer to see through the adhesive without substantial degradation of the image quality or light transmission. It is also contemplated that the adhesive could be a diffuse adhesive or a tinted adhesive. Preferably, the adhesive optically couples the screen to the transparent surface without substantial degradation of the image quality or light transmission.

The adhesive is preferably a removable adhesive as opposed to a permanent adhesive. As used herein, the phrase "removable adhesive" means an adhesive that is designed to afford a temporary, secure attachment of the screen 52 to the transparent surface while affording convenient, manual removal of the screen 52 from the transparent surface without damaging the transparent surface or resulting in excessive residue or adhesive transfer from the screen to the transparent surface. Examples of removable adhesives are disclosed in U.S. Pat. Nos. 3,691,140; 4,166,152; 4,968,562; 4,994,322; 5,296,277 and 5,362,516 (the entire contents of which are herein incorporated by reference). In contrast, a permanent adhesive would permanently adhere the screen 52 to the transparent glass and render it very difficult to remove from the window without damaging the window. Preferably, the removal force for removing a screen from a glass window would be between about 20 grams to about 5.0 pounds force per lineal inch, more preferably, the removal force for removing a screen from a glass window would be about 0.5 to about 2.0 pounds force per lineal inch.

Optionally, the adhesive may be a reusable adhesive. As used herein, the phrases "reusable adhesive" or "repositionable adhesive" mean an adhesive that i) affords a temporary, secure attachment of the screen 52 to the transparent surface while affording convenient, manual removal of the screen 52 from the transparent surface without damaging the transparent surface or exhibiting excessive adhesive transfer from the screen assembly to the transparent surface, and ii) then affords subsequent reuse of the screen (e.g. on another transparent surface).

The adhesive preferably covers substantially all of the viewing surface side of the screen to provide uniform optical coupling of the screen to the window. In such instances, it may be useful to use an adhesive with special features to address the problem of entrapped air between the screen and substrate. Suitable adhesives are believed disclosed in U.S. Pat. No. 6,197,397 and PCT Publication No. WO 00/56556 (the entire contents of both of which are incorporated by reference).

Alternatively only portions of the viewing surface of the screen 52 may be coated with the adhesive. Those coatings may be striped, triangular, polymeric or another pattern. While the adhesive is preferably an optical adhesive, it should be noted that non-optical adhesives may be used, particularly when the adhesive does not cover the entire surface of the screen. For example, with large screens where small imperfections in the screen may not be as apparent to a viewer, a few imperfections resulting from a non-optical adhesive may be more easily tolerated. An opaque adhesive may even be used as a border to help expedite installation of the screen as described in more detail below.

It is noted that the adhesive may comprise a stretch release adhesive assembly mounted in strategic positions (e.g. the four corners) of the screen. A suitable example is believed to be any of the Command series of adhesive products, generally available from Minnesota Mining and Manufacturing Co. of St. Paul, Minn. The stretch release adhesive assembly need not be clear, but it nevertheless provides removable screen.

The screen 52 may be placed on any substantially transparent surface as long as it is in a position capable of being viewed by the potential customer 51. The substantially transparent surface may comprise exterior or interior doors or windows or any other transparent surface at a location 50. It will be appreciated that the transparent surface may be somewhat opaque. For example, the surface may comprise a tinted, dirty or colored window, or it may comprise a window that has a wire pattern embedded in the glass. For a window with framing or other opaque portions, it is possible to manually cut a flexible screen 52 during installation to customize it for use with a particular shape of a window.

The screen 52 is preferably placed in high traffic areas such as airports, train stations, highways, banks, shops, cafes, ports, malls, shopping centers, trade shows, sports centers, convention centers, entertainment complexes, pubs, roads, grocery stores, entertainment centers, restaurants, securities companies, bars, nightclubs, bistros, retail outlets, auto dealerships, markets, convenience stores, CD stores, entertainment pavilions, bike trails, travel agencies, banks, bookstores, hardware stores, warehouses, franchises, tourist attractions, and trading exchanges.

The screen 52 is preferably releasably adhered to the window in a removable fashion. As used herein, when it is said that the screen is releasably adhered to a substantially transparent surface (e.g. a window) in a removable fashion, it is meant that the screen may be conveniently manually removed from the window without substantially damaging the window or adjacent surfaces.

The removable feature of the screen 52 renders it particularly useful for providing information to potential customers temporarily or during a predetermined time period. For example, an automobile dealership may wish to temporarily display advertising during a short time period to promote a fleeting bargain and generate excitement with consumers. Alternatively, a new place of business may wish to attract attention to a grand opening sale. In another embodiment, a centrally managed business may desire to engage in a transient marketing program designed to temporarily promote a good or service.

The screen 52 may optionally be a disposable screen. For example, beaded screens are typically much less costly than a holographic screen. As a result, it may be convenient for a user to simply dispose of the screen 52 after use. Another advantage of a beaded screen is that a flexible beaded screen may be conveniently tiled together to create a large format screen (e.g. greater than 100 inches in diagonal) without encountering the difficulties associated with attempting to tile together large area rigid screens.

A business may desire to provide uniformity in some of the elements of the information (e.g. a marketing program) including the timing and content of the program. For example, a copyright owner (e.g. from the entertainment industry) may grant a temporary license to use copyrighted video images to business 50 for use during a predetermined time. The business may wish to prevent any replay of that video after a predetermined time in order to comply with the agreement with the copyright owner. The present invention allows the screens 52 to be removed after that predetermined time to prevent display of the images.

Another embodiment of the invention illustrates that the time period need not be a predetermined time period. For example, a retail store may wish to promote certain inventory for a period of time until the inventory is depleted. The screens of the present invention may be installed during the unknown or uncertain duration of time needed to deplete the inventory. While the duration of the time period is uncertain, it is nonetheless a temporary time period.

Figure 10:
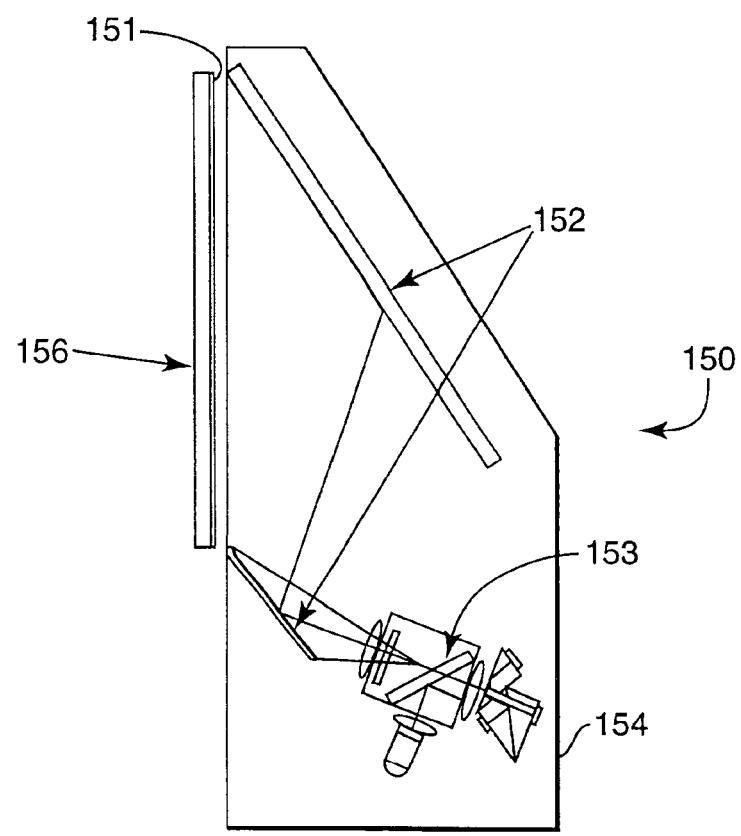
FIG. 10 is a side view of a housing for use with a projector and screen according to an aspect of the present invention.

Referring now to FIG. 10, the present invention is particularly suitable for use with an optical system that includes a projector 153, frame 154, optional mirrors 152 and screen 151. While the illustrated optical system 150 include two mirrors 152, it is noted that the optical system according to the present invention need not include a mirror (such as the single lens projector shown in FIG. 7 and discussed in greater detail below).

The projector 153 projects an image toward screen 151. The screen 151 has a rear side that receives light originating from projector 153 and a front side or viewing side. The screen is temporarily attached to a substantially transparent surface such as window 156. In use, the viewer looks at the window 156 to see the image provided by the optical system 150.

The projector 153 and mirrors 152 may be pre-installed in the frame 154. This allows the projector 153 and mirrors 152 to be pre-assembled at a remote, centralized location such as a warehouse or factory. In this embodiment, to install the optical system 150 at a place of business (e.g. 50 in FIG. 5), the user would merely need to adhere the screen 151 to a window and then position the frame 154 proximate the window, thereby even further simplifying installation and removal at the location 50.

In a preferred embodiment, the screen 151 comprises a rear projection screen such as a beaded screen. Other screens are also contemplated for use with the present invention including diffusion screens. For example, the optical system may include a fresnel lens and/or a lenticular lens or sheet as described in or constructed in accordance with U.S. Pat. Nos. 3,712,707; 3,872,032; 4,379,617; 4,418,986; 4,468,092; 4,509,823; 4,576,850 and 5,183,597 (the entire contents of which are herein incorporated by reference). Screens that use significant refraction to achieve a desired viewing angle are preferred.

Figure 11:
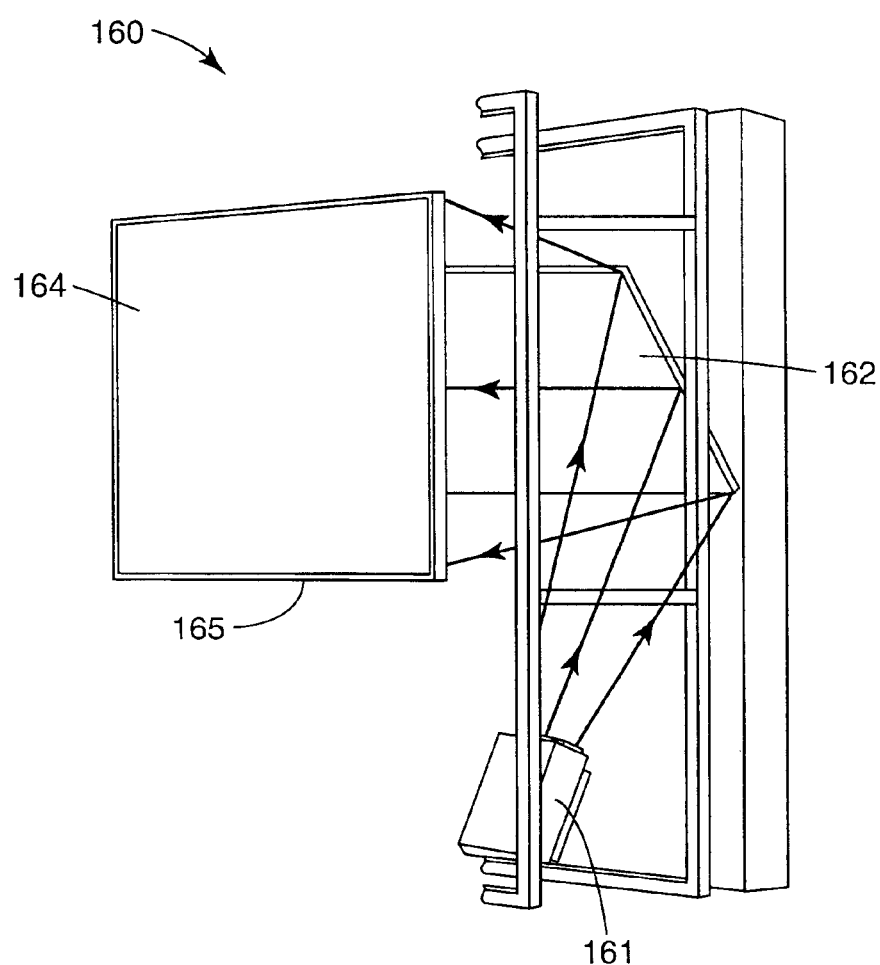
FIG. 11 is a perspective view of another housing for use with a projector and screen according to another aspect of the present invention.

Referring now to FIG. 11, there is shown another embodiment of optical system 160 for use in the present invention.

The optical system 160 includes a projector 161, one mirror 162, an adjustable frame and stand system, and screen 165 adapted to be associated with a window 164.

The adjustable frame and stand system accommodates the use of different projectors 161 in the system. For example, an on-axis projector may be used with a first promotional campaign. Thereafter, the on-axis projector may be replaced with an off-axis projector for a second promotional campaign having different video requirements.

Referring now to FIG. 1, there is shown a first embodiment of screen 10 according to the present invention. The screen 10 has a front side or viewing side closest to a viewer, and a back side opposite the viewing side.

The screen 10 has a plurality of refractive elements 14 (e.g., glass beads), a light transmitting substrate 16, and a light absorbing layer 12. The plurality of refractive elements 14 are preferably situated in substantially predetermined positions with the understanding that manufacturing and cost limitations may limit the precision of the placement. For example, the refractive elements 14 may be placed in an array, a closely or loosely packed arrangement.

The light absorbing layer 12 may be coated on or associated with the light transmitting substrate 16. The light absorbing layer 12 helps controls ambient light rejection for the optical system of the present invention. The screen 10 supplies excellent contrast characteristics even in high ambient lighting conditions.

Ambient Light Contrast Ratio

Figure 18:
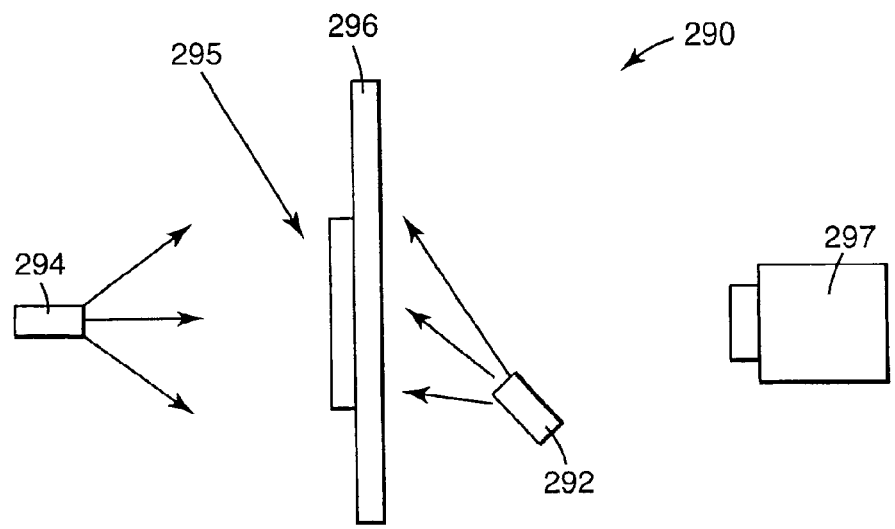
FIG. 18 is a schematic illustration of testing assembly used to measure contrast.

As used herein, ambient light contrast ratio (ALCR) means a ratio of the brightness of a white image to a black image and depends on the ability of a screen to absorb the ambient light. FIG. 18 illustrates a testing assembly 290 for measuring ALCR.

The assembly 290 comprises two collimated tungsten light sources 294 and 292 (e.g. Fostec DCR II DC regulated sources with DDL lamp & iris), a screen sample holder 296, an image target 295, an illumination meter (e.g. a Minolta Illumination meter), a CCD camera (e.g. a Kodak Megaplus ES 1.0 CCD Camera), and a computer system equipped with a frame-grabber and software (e.g. Image Pro Plus) to acquire the image. Optionally, the light source 292 need not be collimated.

The collimated tungsten light source 294 is placed approximately 450 mm from the sample holder 296, the sample holder 296 is placed approximately 76 mm from the collimated tungsten light source 292. The CCD camera 297 is placed approximately 125 mm from the sample holder 296.

The ALCR test is performed under no ambient illumination from the room. Using an illumination meter the ambient light level on the viewer side is set to the desired level by light source 292. In this test, the ambient light level is set at 500 lux. The screen 295 under test is placed in the sample holder 296. A 1 mm thick chrome test target 295 about 50 mm wide with a series of rectangular apertures (nominally 1 cm squared, length approximately 10 mm) is then placed against the screen under test (against the light source side). The CCD camera is focused on the pattern of white and black lines and the transmitted light level is set to the desired level. Light of about 75 candelas/meter squared is projected from the light source 294. The projected image is captured and the intensity is scanned. A series of five measurements may be taken (all four corners and the center of the screen).

The Ambient Light Contrast Ratio is calculated from the ratio of the average intensity of the white image over the average intensity of the black image.

$$\text{Contrast Ratio} = \frac{\text{Luminance of White Image } (L_W)}{\text{Luminance of Black Image } (L_B)}$$

Figure 19:
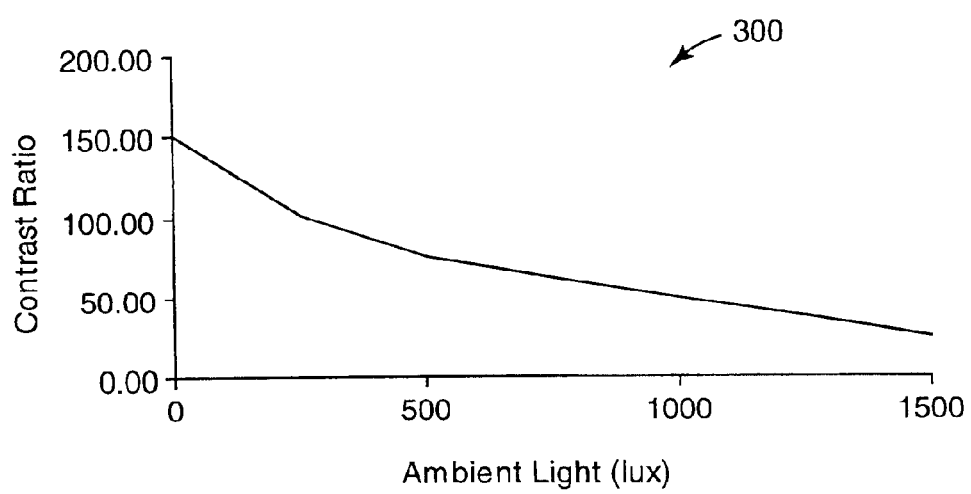
FIG. 19 is a graph of contrast ratio along the y-axis and ambient light (in lux) along the x-axis.

Beaded screens are particularly suitable for use in the present invention as they provide excellent contrast performance in high ambient light conditions. FIG. 19 is a graph 300 of the contrast ratio to ambient light of a typical beaded screen. The screen comprises an XRVS Beaded Screen available from Minnesota Mining and Manufacturing Company of St. Paul, Minn. Preferably, for ambient light of about 500 lux, a screen according to the present invention provides an ALCR of greater than about 25, more preferable the ALCR is greater than about 50 and more preferably greater than about 75.

Referring again to FIG. 1, the light absorbing layer 12 may be opaque or substantially opaque. The absorbing layer 12 preferably comprises one or more of a powder coating of carbon black, a black dye, an opaque particle, an organic or inorganic pigment or particle, or such a particle dispersed in a binder material. They may be of a wide variety and shapes. The material may be dispersed in a liquid or solid binder system. In one embodiment, the absorbing layer 12 comprises a clear binder having black particles dispersed therethrough. The binder may comprise, for example, an acrylate or other UV curable polymer. The absorbing layer 12 may be applied by a conventional technique such as a coating process or powder coating.

The refractive elements 14 may be constructed from glass or polymeric materials. Suitable examples include glass or a transparent plastic material. The beads and construction of such screens may comprise the teachings disclosed in commonly assigned patent applications PCT WO 99/50710 and PCT WO 98/45753, and U.S. patent application Ser. No. 09/560,267 filed Apr. 26, 2000 entitled "Rear Projection System With Reduced Speckle"; and Ser. No. 09/717,598 filed Nov. 21, 2000 entitled "Optical System with Reduced Color Shift" entitled "Projection Screens and Methods For Making Such Projection Screens" (Inventors: Geoffrey Morris and Jim Stevenson) and U.S. Pat. No. 6,204,971 (the entire contents of each of which are herein incorporated by reference).

Beaded screens afford exceptional contrast and viewing angle that allow a bright, sharp picture to be viewed at wide angles while minimizing any losses in image quality due to washout from sunlight or room lighting. Beaded screens may be constructed to provide substantially symmetric horizontal and vertical viewing angle and gain characteristics. This may be particularly useful for large screens used in multilevel locations (such as shopping malls) where a person located on a level above or below the screen may wish to view the screen. Also, beaded screens may be constructed to be flexible so that they can be easily mounted to any rigid, transparent surface minimizing surface reflection losses that might be present with a conventional rigid rear projection screen.

The refracting elements 14 are preferably transparent, spherical, refracting beads seated in an absorptive, high optical density transparent polymer matrix. The beads are preferably in intimate contact with the transparent binder material. The beads preferably have a refractive index between about 1.2 and 1.9. Preferably, the spherical beads have an average diameter of greater than about 20 $\mu$m and less than about 400 $\mu$m, more preferably, the average diameter is between greater than about 40 $\mu$m and less than about 90 µm, more preferably the average diameter is between 50 µm and about 80 µm and even more preferably the average diameter is about 65 µm.

The substrate 16 is preferably flexible to help render the screen 10 flexible. The substrate may preferably be constructed from suitable light transmitting materials such as polyvinyl chloride, acrylic, polycarbonate or combinations of such materials.

The substrate 16 is preferably substantially transparent or translucent. Suitable transparent substrates include flexible substrates constructed from acrylic. The substrate 16 may have an optional matte anti-glare finish at the exit, preferably achieved by embossing. It should be noted that the substrate 16 itself is optional as it could be removed (e.g. if the refractive elements 14 and layer 12 are self-supporting) by etching or another process.

The screen 10 also includes an adhesive 18, preferably a removable, optical adhesive. Optical adhesives that are believed to be suitable are disclosed in PCT WO 97/01610 (the entire contents of which are herein incorporated by reference). Alternatively, the adhesive may be reusable or repositionable.

Nonlimiting examples of adhesives 18 include strong, tacky adhesives such as acrylic adhesives available from 3M and Ashland Chemical Company of Columbus, Ohio, USA (such as Aroset™ branded acrylics); and those constructions disclosed in U.S. Pat. No. 5,196,266 and PCT Patent Publication WO94/21742. Nonlimiting examples of other pressure sensitive adhesives 18 can generally be found in Satas, Ed., *Handbook of Pressure Sensitive Adhesives*, 2$^{nd}$ Ed. (Von Reinhold Nostrand 1989). Of these adhesives, desirable adhesives include solvent-based acrylic and rubber adhesives, water-based acrylic adhesives, hot melt adhesives, microsphere-based adhesives, and silicone-based adhesives, regardless of their method of preparation.

In another preferred embodiment, the adhesive 18 is washable. For purposes of the present invention, a "washable" adhesive is an adhesive that can be treated by an appropriate cleaning solution (such as water or soap and water) to remove materials detrimental to an adhesive, thereby at least partially refreshing the adhesion of a used surface. After a number of uses, the adhesive 18 may become dirty or otherwise detackified. Washing of washable adhesives removes materials that detract from the adhesion performance of the surface, and refreshes the surface for additional uses for screens.

Other nonlimiting examples of adhesives 18 include acrylic adhesives from 3M and Ashland Chemical Co. and a nontacky adhesive such as a terpolymer of acrylonitrile, butadiene, and isoprene, or similar copolymer of acrylonitrile and either butadiene or isoprene, commercially available under the brand Nipol adhesives from Zeon Chemical Co., Louisville, Ky. USA and those adhesives disclosed in EPO Patent Publication EP 0 736 585 (Kreckel et al.). Some of these adhesives are "washable" in that their tackiness diminished by dirt or other deleterious surface contact can be restored after cleaning with common cleaning agents including without limitation rinsing with clean water. Thus, these latter adhesives are desired when "cleanability" is a desired feature such as when the adhesive is reusable.

Coating weights of adhesive 18 can range from about 10 µm to about 300 µm and preferably about 20 µm to about 250 µm. Percent solids of such adhesives in the formulations to be applied on layer range from about 5% to about 100% and preferably from about 20% to about 100%.

Among the more preferred are acrylic adhesives having permanently low tack such as microsphere-based adhesives disclosed in U.S. Pat. No. 5,141,790 (Calhoun et al.); U.S. Pat. No. 5,296,277 (Wilson et al.); U.S. Pat. No. 5,362,516 (Wilson et al.) and EPO Patent Publication EP 0 570 515 B1 (Steelman et al.).

The adhesive 18 may be applied using a variety of techniques known to those skilled in the art such as casting, extruding, coating, spraying, screen-printing and laminating.

The refractive index of the adhesive 18 is preferably between about 1.40 and 1.9, more preferably between 1.4 and 1.55. Preferably, the index of refraction of the adhesive 18 is close to the index of refraction of the substrate 16 (i.e. $\Delta n = n_{adhesive} - n_{substrate}$~small) so that a minimum amount of scattering occurs that may reduce the brightness or other optical properties of the screen. Preferably, the difference in the indexes of refraction is less than about 0.15 more preferably 0.1 or less. Alternatively, other factors may be varied to achieve the desired effect.

The screen optionally includes a backing 19 that is designed to be manually removed from the screen 10 just prior to installation of the screen 10 on a window. The backing 19 protects the screen from damage and from adhesive contamination prior to use of the screen.

Figure 2:
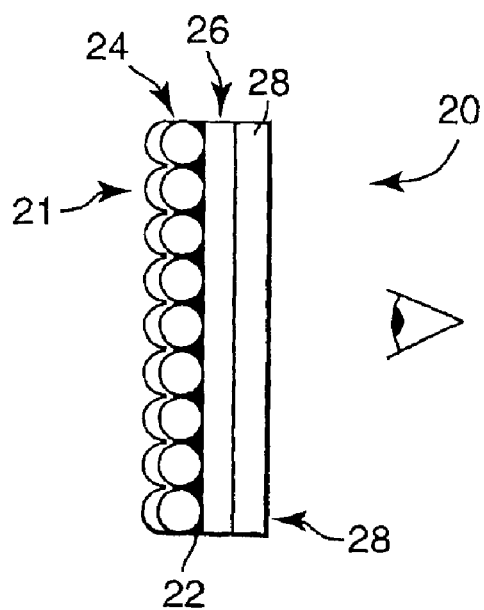
FIG. 2 is a schematic side view of a second embodiment of a rear projection screen according to an aspect of the present invention.

FIG. 2 shows another embodiment of screen 20 according to one aspect of the present invention. The screen 20 has a front side or viewing side closest to a viewer, and a back side opposite the viewing side. The screen 20 has an array of refractive elements 24, a light transmitting substrate 26, a light absorbing layer 23; and a removable optical adhesive 28.

The transparent, spherical, refracting beads 24 are preferably seated in an absorptive, high optical density polymer matrix and are in intimate contact with the transparent binder material. The screen 20 also includes a performance enhancing coating 21 such as those described in U.S. pat. application Ser. No. 09/560,267 filed Apr. 26, 2000 entitled "Rear Projection System With Reduced Speckle"; and Ser. No. 09/717,598 filed Nov. 21, 2000 entitled "Optical System with Reduced Color Shift" (the entire contents of each of which are herein incorporated by reference).

Optionally, the layer 21 may comprise a hard coat, an anti-static coating, anti-scuff coating or combinations thereof. Such coatings may be included to help protect the screen and to render the screen cleanable. The ability to clean the screen is particularly useful for a screen that has a reusable adhesive and that is designed to be reused as described more fully below.

Figure 3:
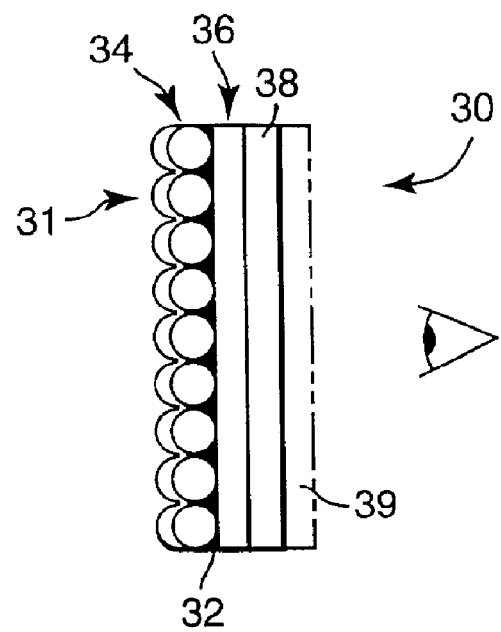
FIG. 3 is a schematic side view of a third embodiment of a rear projection screen according to an aspect of the present invention.

FIG. 3 illustrates another embodiment of screen 30 according to the present invention. The screen 30 includes a flexible substrate 36, an optical adhesive 38, opaque matrix 32, performance enhancing coating(s) 31 and glass beads 34. The screen also includes a backing 39 for protecting the screen 30 from contamination or mechanical damage (e.g. scratching). The backing is designed to be removed just prior to installing the screen 30.

Figure 4:
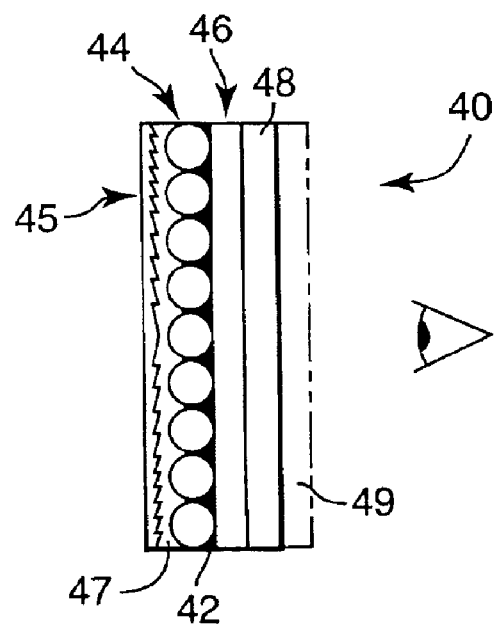
FIG. 4 is a schematic side view of a fourth embodiment of a rear projection screen according to an aspect of the present invention.

FIG. 4 illustrates another embodiment of screen 40 according to the present invention. The screen 40 includes a flexible substrate 46, an adhesive 48, opaque matrix 42, beads 44, and optional releasable liner 49. The screen also includes a fresnel lens 45 incorporated near the rear surface of the beads 44 with an adhesive 47 (preferably affixed at the edge of the screen leaving an air gap between next to the surface of the fresnel closest to the beads). For example, the fresnel lens 45 may be constructed in accordance with the disclosures in one or more of U.S. Pat. Nos. 3,712,707; 3,872,032; 4,379,617; 4,418,986; 4,468,092; 4,509,823; 4,576,850 and 5,183,597 and published Japanese document nos.: 64-86102 assigned to DAINIPPON PRINTING CO. LTD. (publication date Mar. 30, 1998); 63-134227A assigned to DAINIPPON PRINTING CO. LTD. (publication date Jun. 6, 1988) and 5-119205 assigned to DAINIPPON PRINTING CO. LTD. (publication date May 18, 1993) (the entire contents of each of which are herein incorporated by reference).

Alternatively, a light refracting film {e.g. Transmissive Right Angle Film (available from Minnesota Mining and Manufacturing Company of St. Paul, Minn.)} may be used instead of or in conjunction with the fresnel 45 to afford a more convenient location of the projector relative to the screen.

Figure 12:
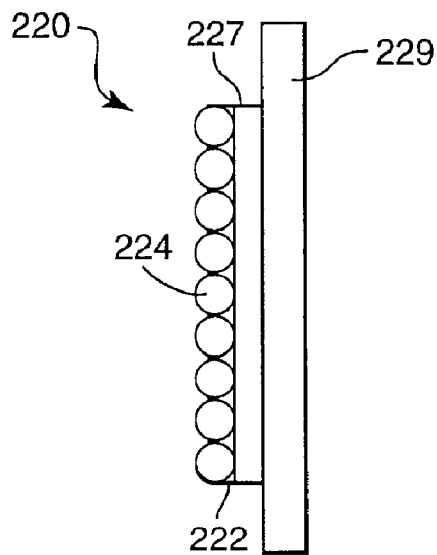
FIG. 12 is a schematic side view of another embodiment of a rear projection screen according to an aspect of the present invention.

FIG. 12 is another embodiment of screen 220 adapted to be releasably attached to a transparent surface 229 according to the present invention. Screen 220 includes microspheres 224, opaque matrix 222 and a cling member 227. The cling member 227 is substantially transparent or clear.

The cling member 227 may be constructed from any suitable materials. As used herein, cling materials mean plasticized polymeric compositions and electret materials. These materials are know to readily adhere to certain transparent materials (e.g. glass). Nonlimiting examples include plasticized ethylene vinyl acetate and polyvinyl chloride. Suitable materials are believed described in U.S. Pat. Nos. 4,095,013, 5,899,010, and 6,171,681 and PCT Publication Nos. WO 99/65999 and 98/39157, (the entire contents of each of which are herein incorporated by reference). Many of these cling materials exhibit the desirable feature of being washable with clean water.

In another embodiment cling material 227 may be described as adhesive that is not tacky to contact with most materials but is capable of releasably securing to a particular substrate (e.g. glass). In other words, cling material 227 is discriminately adhesive and otherwise has little or no tack for adhesion to other materials.

Figure 13:
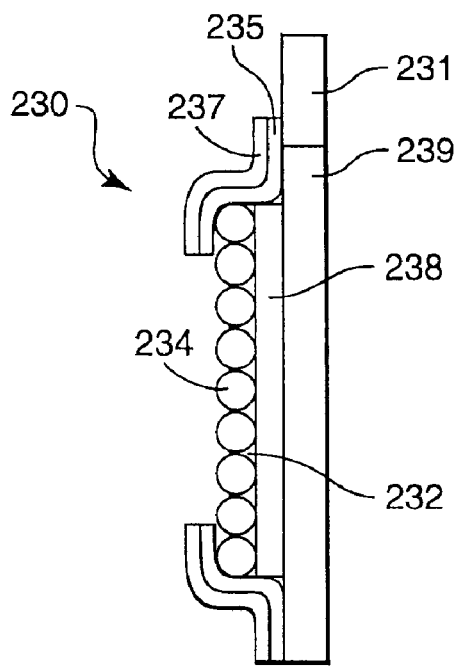
FIG. 13 is a schematic side view of another embodiment of a rear projection screen according to an aspect of the present invention

FIG. 13 is another embodiment of screen 230 designed to be associated with an window 239 or other transparent surface in a structure 231. The screen includes a monolayer of microspheres 234, a light absorbing layer 232 and a substantially transparent substrate 238. The screen 230 is associated with the window by virtue of tape that includes a backing 237 and adhesive 235.

The backing 237 and adhesive 235 may be substantially clear or opaque. If the backing 237 is opaque, certain set up advantages may be enjoyed. Since the light from a projector is typically quite bright, it is important that no light be projected through the window 239 without being filtered by the screen. The distance between the screen 230 and projector should be carefully regulated to prevent light from spilling over the border of the screen. With an opaque backing 237, a margin of error during installation is enjoyed.

Figure 17:
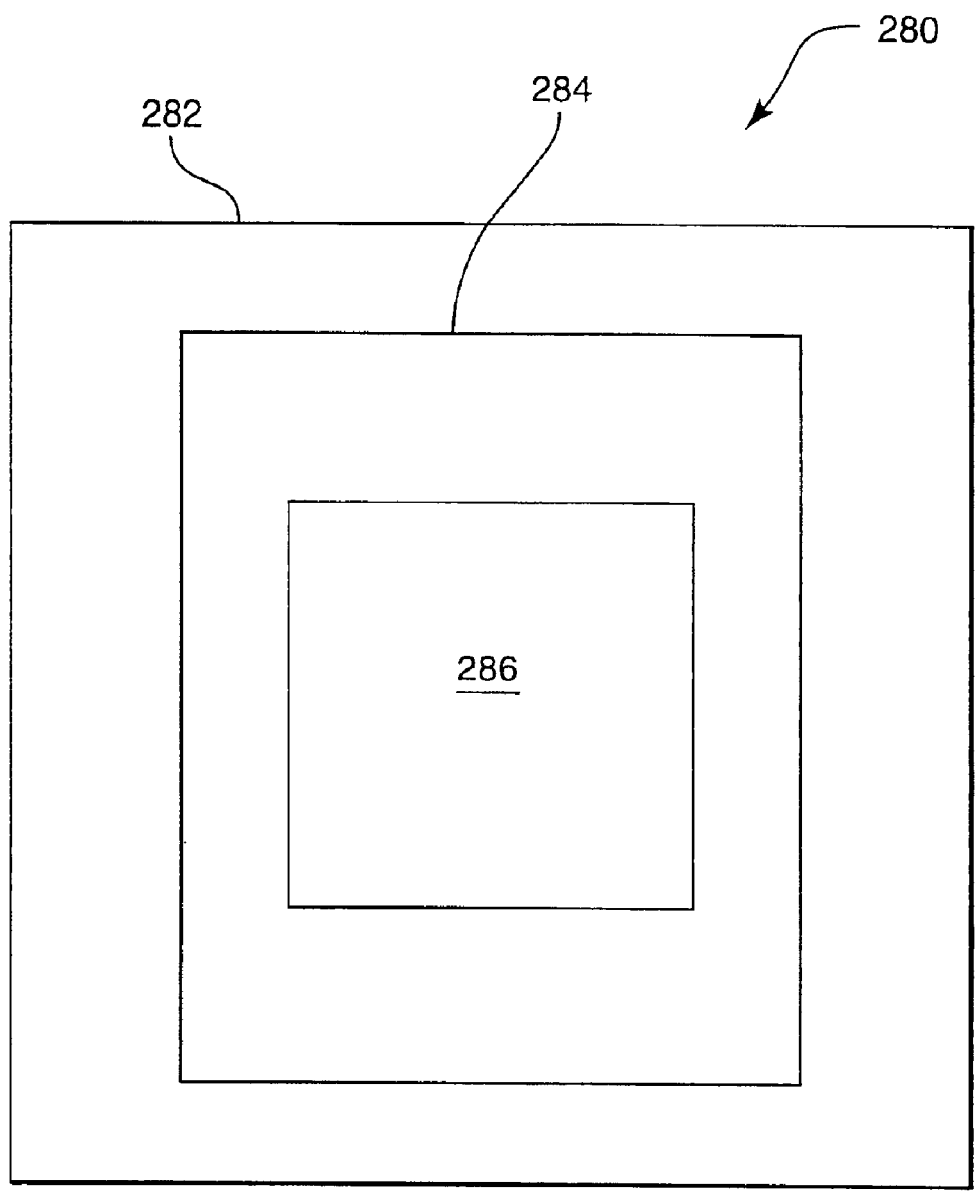
FIG. 17 is a schematic drawing of a screen with a border according to another aspect of the present invention.

FIG. 17 illustrates a system 280 that includes a tape that forms a printed border 284. Using printed border tape to associate a screen 286 with a window (e.g. frame 282) affords a display where the screen is offset from the window frame. It also reduces the chance that a slightly misaligned projector will shine directly into the eyes of a viewer. The border 284 could be a single color or it could include graphics, characters, advertising or other printing.

Figure 14:
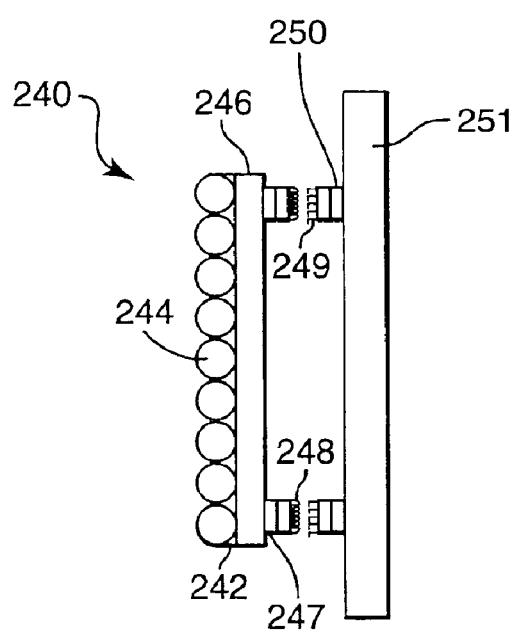
FIG. 14 is a schematic side view of another embodiment of a rear projection screen according to an aspect of the present invention.

FIG. 14 is another embodiment of screen 240. The screen includes microspheres 244, light absorbing means 242 and substrate 246. The screen 240 is associated with transparent surface 251 (e.g. a transparent door) with a two component mechanical fastener. The mechanical fastener includes at least one element 249 associated with the door 251 (or nearby structure) by, for example, an adhesive 250, and a second element 248 associated with the screen 240 by, for example, an adhesive 247. Preferably, the adhesive 250 is a removable adhesive so that it does not damage the door 251.

The mechanical fasteners preferably releasably attach the screen 240 to the door 251. The mechanical fasteners may comprise hook and loop, interference or friction type mechanical fasteners. Suitable mechanical fasteners are believed described in U.S. Pat. Nos. 4,875,259, 5,196,266, 5,316,849 and 5,201,101 and PCT publication no. 98/39759 (the entire contents of each of which are herein incorporated by reference). The mechanical fasteners allow the screen to be reused at a plurality of locations.

Figure 6:
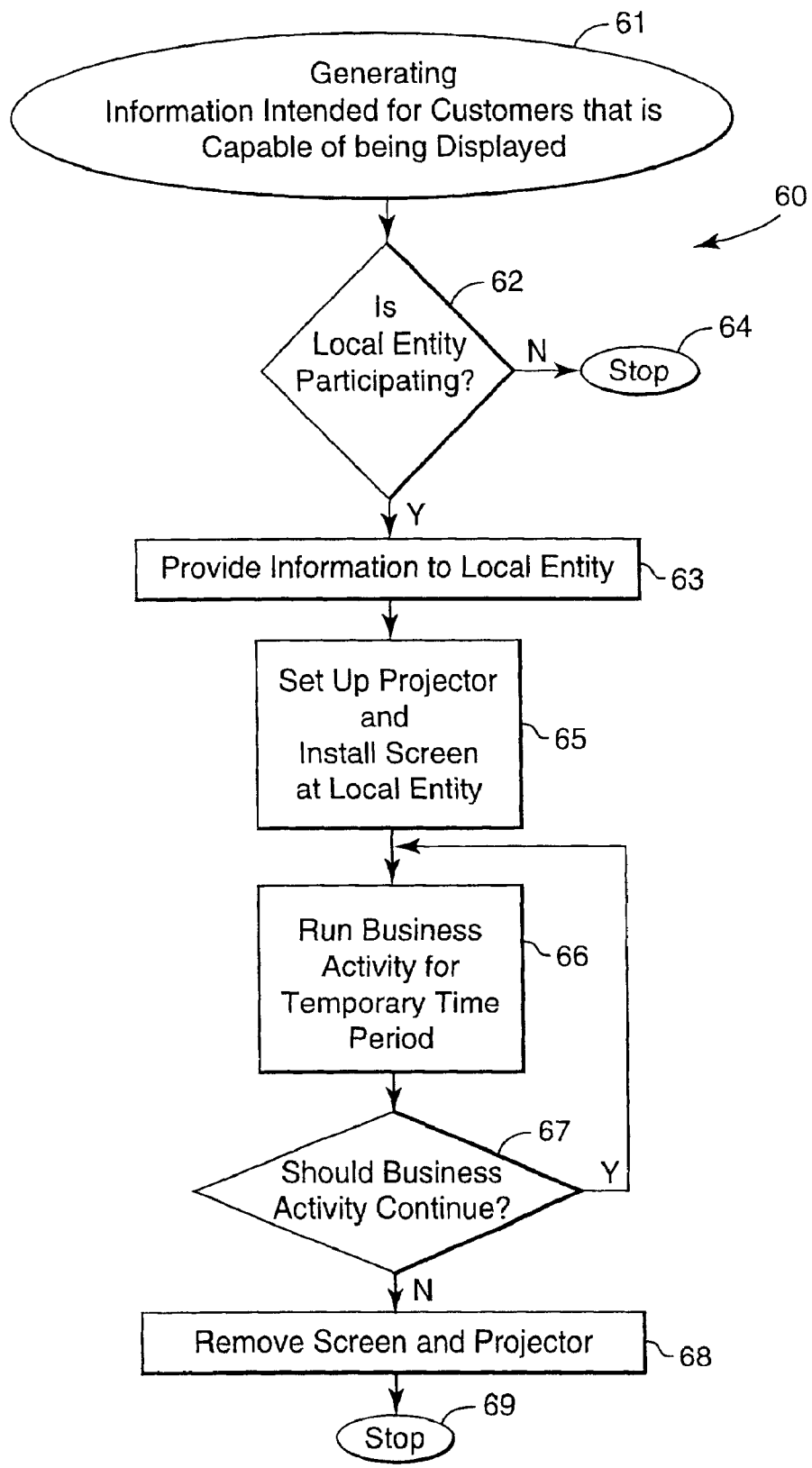
FIG. 6 is a flow chart of a method of providing information to a potential customer according to another aspect of the present invention.

FIG. 6 is a flowchart illustrating a novel method of temporarily displaying information to a viewer such as a potential customer at a remote location. Step 61 is the generation of the information intended for the potential customers. As discussed above, this information can comprise any suitable information that would be useful to communicate to a potential customer. For example, a centrally managed business (e.g. a fast-food restaurant) may wish to control an expensive advertising or marketing campaign. The information may associate a popular character that is trademarked or copyrighted with a good or service sold by the fast-food business. The centrally managed fast-food business may only have the right to use the character in its advertising campaign temporarily. As a result, there would be a desire to display this information temporarily and to make sure the information is not displayed after the temporary time period.

The centrally managed fast-food business may have a plurality of local entities (e.g. franchise locations) situated in diverse or even remote regions. In step 62, the centrally managed business may decide which local entities will participate in the advertising campaign. For example, the character may not be popular in some regions, or some local entities may not wish to assume the expense associated with the advertising campaign. Those local entities may opt out in step 64 and fail to receive or display the information.

Once it is decided that a local entity would participate in the advertising campaign, the information may be provided to the local entity in step 63. The information may be provided to the local entity in a variety of fashions depending on the optical system used at the local entity. For example, the information may be provided in the form of electronic media containing software. Upon installation of the software in a computer, upon association of the computer with the projector, and upon execution of the software, the software will cause the computer to carry out the method of presenting information to a potential customer according to the present invention.

Figure 9:
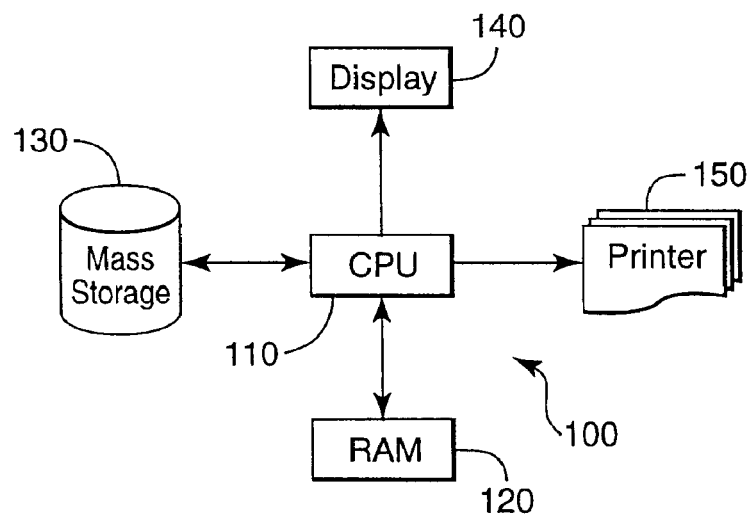
FIG. 9 is a block diagram of a computer system useful with the present invention.

FIG. 9 illustrates a computer system 100 suitable for use in a method of the present invention. The computer system 100 includes a central processing unit (CPU) 110, random access memory (RAM) 120, mass storage device 130 (such as a hard drive, CD-ROM drive, diskette drive or the like), a link to a projector 140 (such as an, LED, LCD or plasma display) and an optional printer 150 (such as a dot matrix printer, a laser printer, or an ink jet printer). The elements of the computer system 100 are associated such that the CPU can read and write to the RAM 120, and the mass storage device 130 can control the images communicated to the projector 140 and the output of the optional printer 150. The computer system 100 may comprise a central registry computer controlled by the centrally controlled business (e.g. at corporate headquarters). Additionally, the computer system could also be a local server computer located at the local entity (e.g. the franchise locations).

A variety of methods may be used to provide the local business entities with the electronic media containing the software with the information for the potential customers. For example, the information may be recorded on a disk or DVD and simply mailed to the local entities. Alternatively, the information may be provided to the local entities via a generic network such as the internet or an organization specific intranet.

Figure 7:
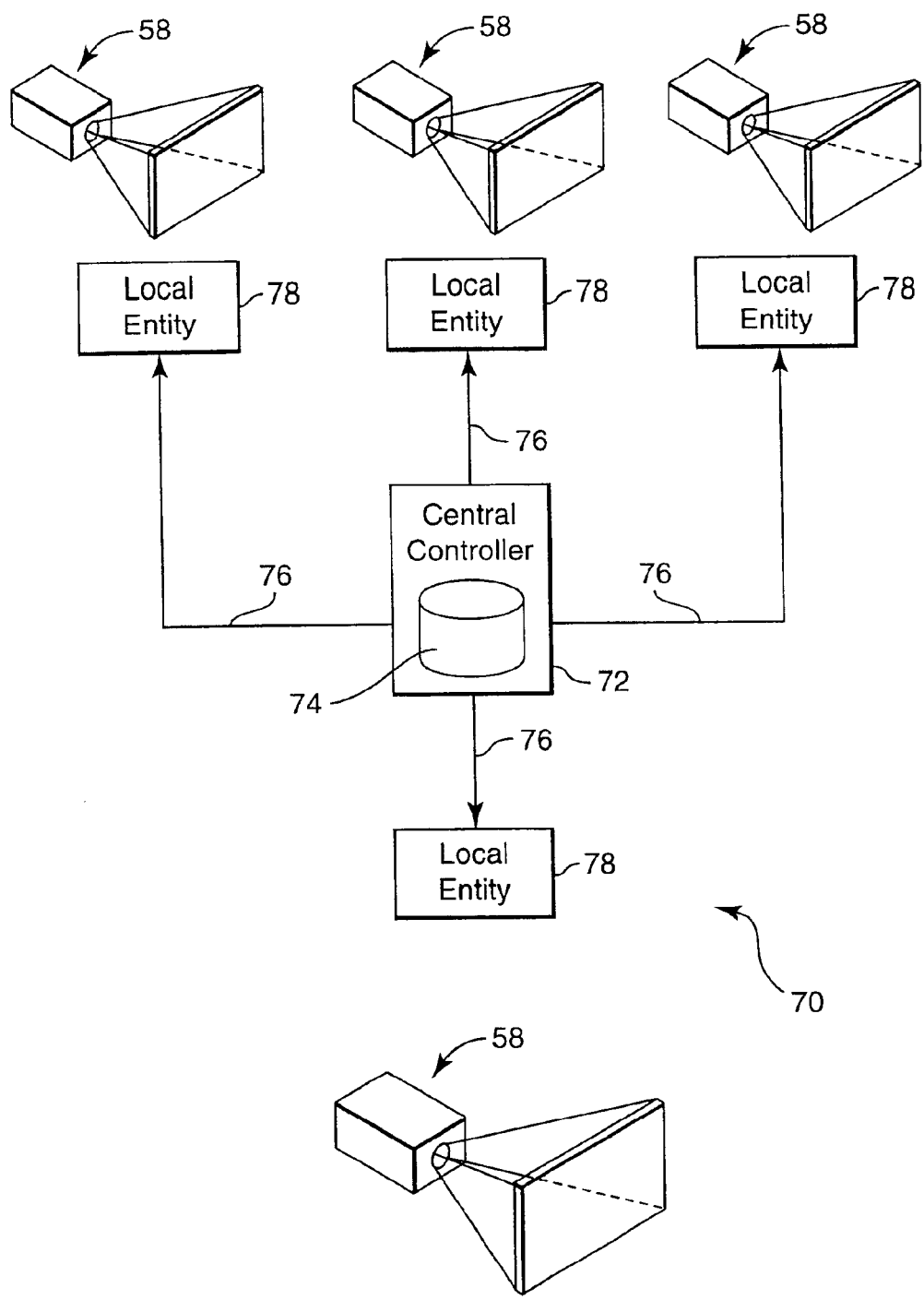
FIG. 7 is a schematic view of a generic network that may be utilized in an aspect of the present invention.

Referring to FIG. 7, the network 70 includes a plurality of local user systems or 78 connecting via the network 76 to a central system or controller 72. For example, the central system or controller may be associated with or controlled by the headquarters of the franchised fast-food business described above with reference to FIG. 6. The advertising campaign may be stored on a hard drive or other storage means 74 controlled by the headquarters of the fast-food business. The central system 72 and each local entity user systems 78 may be generally of the type described as computer system 100 (FIG. 9). The number of users 78 connecting to the central system may be fixed or may vary from time to time. The method of connection may be direct or indirect, e.g., by modem, satellite, downlink, over a dedicated cable or line, over an intervening system (such as the internet), through a wireless connection or by any other appropriate system. In this fashion, qualifying local entities may conveniently immediately receive the information by downloading it from the central controller 72 without requiring the local entities to wait for mail service.

Referring to FIGS. 6 and 7, the method of the present invention includes step 65 of temporarily installing a screen and projector 58 (see FIG. 7) at a specific location at the participating local entity. In step 66, the information is provided to potential customers for a temporary time period. As discussed above, the temporary time period may be predetermined (e.g. the length of a license to use a character) or its duration may be undetermined (e.g. the length of time it takes to deplete inventory).

Eventually, the screen and projector 58 (FIG. 7) will be removed from the specific site at the local entity. It may either be completely removed from the premises, temporarily removed from a particular location, or repositioned at another location (as described below). This takes place in step 68 at after which the method ends 69.

It should be noted that any of the steps in the methods described herein may be taken in any order, provided that preparation steps essential to another step be undertaken first. Additionally, optional steps may be added to the methods described. For example, it may be desirable to cut the screens into a desired shape prior to installation. Non-limiting examples of shapes include silhouettes of characters, trademark shapes, alphabetic letters, geometric patterns and other familiar shapes.

The method of the present invention has the advantage of being able to temporarily convert a mundane location of a business (e.g. a window) into an eye catching, exciting marketing tool for goods and services. A commonplace door may be converted into color in motion that can be tailored to influence purchasing decisions. This tool can be used to concentrate potential customers on a particular local entity, or create excitement surrounding goods or services that can influence buying decisions, or maximize the publicity of a particular special event. When the temporary time period is over, the transparent surface (e.g. a door or window) may be easily converted to its original form.

It is contemplated that, in some instances, the projector and screen 58 need not be removed after the temporary time and may be in continuous use at a particular local entity, albeit at different locations within the local entity. This is particularly suitable for use with customer information that changes over time. For example, a hardware store with diverse products may utilize the projector and screen 58 proximate a lumber location in the store for two weeks. Thereafter, the projector and screen 58 may be moved to a powered instruments portion of the hardware store and present different information to potential customers. In this example, a repositionable or reusable adhesive is particularly desirable to afford convenient reinstallation of screen at a different location. Alternatively, the screen may be disposed of and a new screen may be used.

Figure 8:
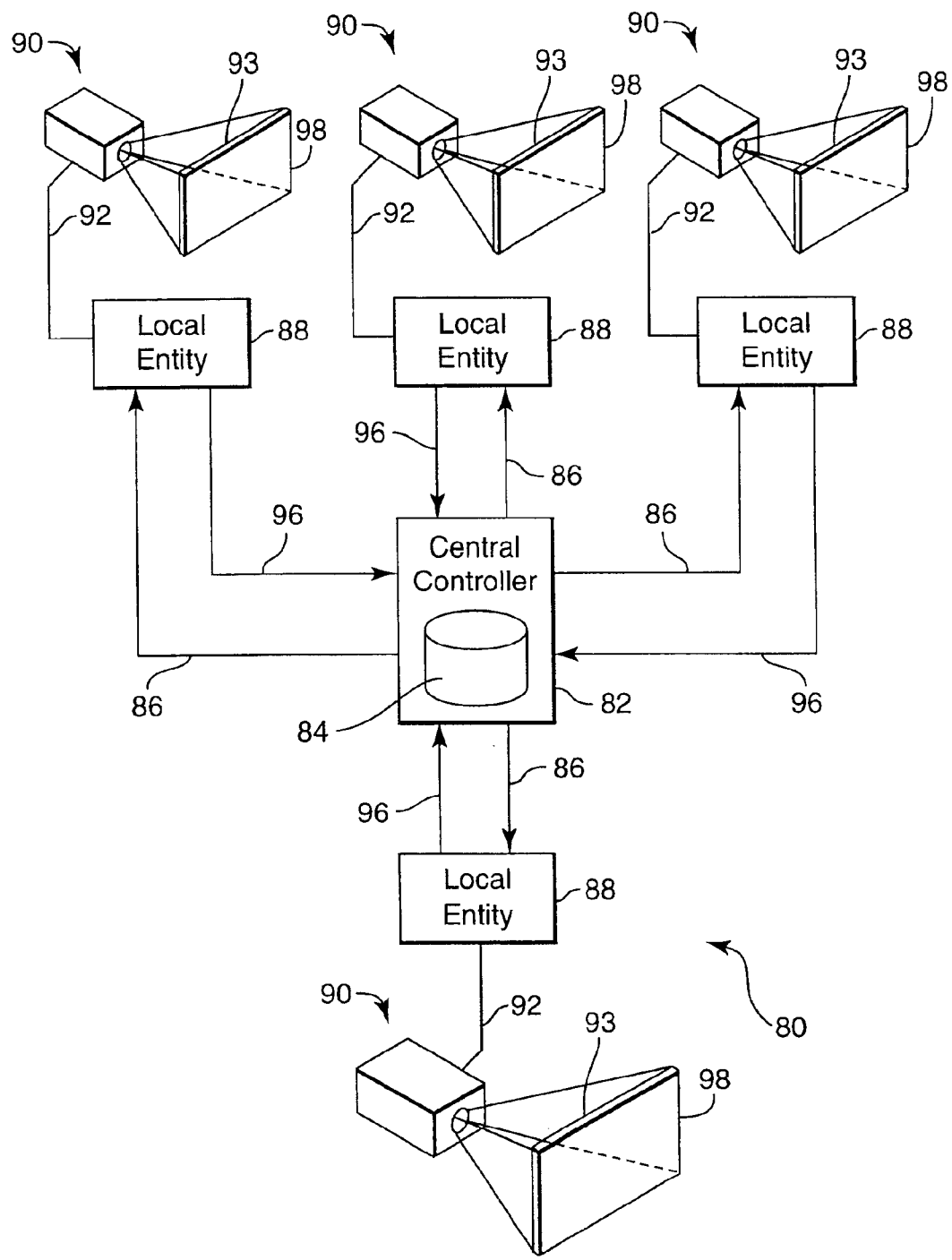
FIG. 8 is a schematic view of a network that may be utilized to exchange information with potential customers according to another aspect of the present invention.

Referring to FIG. 8, there is shown another embodiment of a system 80 for use with the present invention. The system 80 includes a network with a plurality of user systems 88 connected via the network 86 to a central system or controller 82. For example, the central system or controller may be associated with or controlled by the headquarters of an automobile manufacturer such as Ford, Chevrolet or Honda. The local entities 88 may be dealerships. An advertising or promotional campaign may be stored on a hard drive or other storage means 84 controlled by the headquarters and accessed by the dealerships.

The central system 82 and each local entity user systems 88 may be generally of the type described as computer system 100. Each local entity may include a projector 90 and screen 93 adapted to be associated with a window 98 or other transparent surface. In the automobile example, the screens 93 may be cut to the silhouette of a particularly high profit automobile, associated with a window on the automobile, and advertising, promotional and rebate information may be displayed on the window of the automobile itself.

Referring to FIG. 8, information may be fed from the local viewers back to the centrally controlled system 82 via lines 92 and 96. Lines 92 and 96 may communicate any desired information from the potential customers to the central controller 82. For example, the potential customers may use a keyboard or mouse of a computer system to send the information to central controller 82. Alternatively, the information provided to the customers may be altered or modified by virtue of information originating from the potential customers.

The number of local users 88 connecting to the central system may be fixed or may vary from time to time. The method of connection may be direct or indirect, e.g., by modem, satellite link, over a dedicated cable or line, over an intervening system (such as the internet), through a wireless connection or by any other appropriate system. In this fashion, qualifying local entities may conveniently receive the information by downloading it from the central controller 82.

The information requested from the potential customers may be any information useful to the centrally managed business. For example, the information may be used to determine that the useful life of a particular advertising campaign is at an end and the projector 90 and display screens 93 should be removed from the local entity or moved to another position within the local entity. As another example, a motion sensor may be placed near the screen/projector combination to help determine activity proximate the screen/projector combination. This information may be made available to the central controller 82.

The information received from the customer may optionally be transactional information such as a purchase order or an offer or acceptance. This may be achieved in a variety of fashions such as those described in U.S. Pat. No. 5,960,411 (the entire contents herein incorporated by reference). The system 80 may be used to immediately process a rebate, refund, reimbursement or other form of customer benefit, particularly when the computer system 88 at the local entity includes a printer. Also, the information exchanged may constitute an actual sale of a good or service to the customer. This may be accomplished in a variety of fashions such as those disclosed in U.S. Pat. Nos. 5,794,210; 5,794,207; and 5,926,796 (the entire contents of which are incorporated by reference).

Figure 15A:
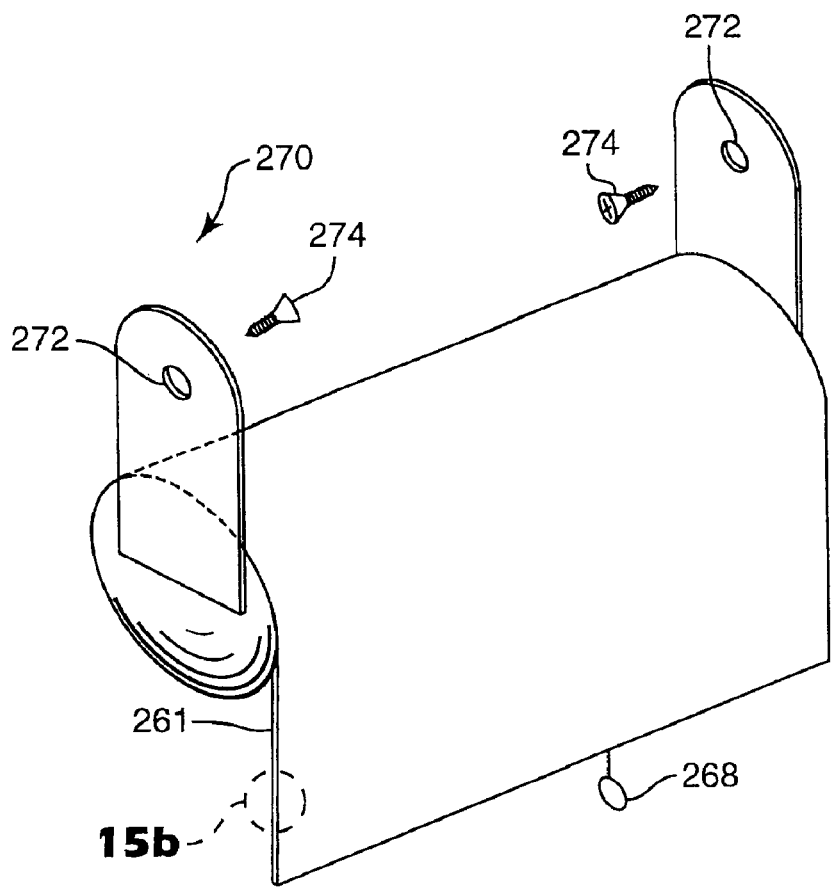
FIG. 15A is a perspective view of a window shade according to another aspect of the present invention.
Figure 15B:
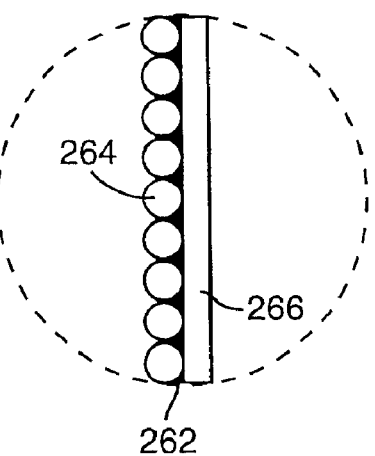
FIG. 15B is a schematic side view inset from FIG. 15A.

FIGS. 15A and 15B illustrate a system 260 including a flexible screen 261 according to the present invention that is not directly attached to a window. The screen 261 includes microsphere glass beads 264, light absorbing layer 262 and flexible substrate 266.

The system 260 may be associated with a window or door through the use of a mechanical fastener. As illustrated, the system 260 may include a frame 270 with a hole 272. A fastener such as a screw 274 or nail may be used to attach the system adjacent a window or door.

The system 260 includes a means for rolling the screen 261 in a cylindrical fashion. The means may comprise a spring operated mechanism as used in a window shade apparatus. A manual grasping means such as a ring 268 may be conveniently incorporated in the screen 261. Alternatively a motorized mechanism may be used to automatically roll and unroll the screen 261. When the screen 261 includes an opaque matrix 262 and is unrolled, the system 260 may conveniently operate as a window shade when not used with a projector.

Figure 16:
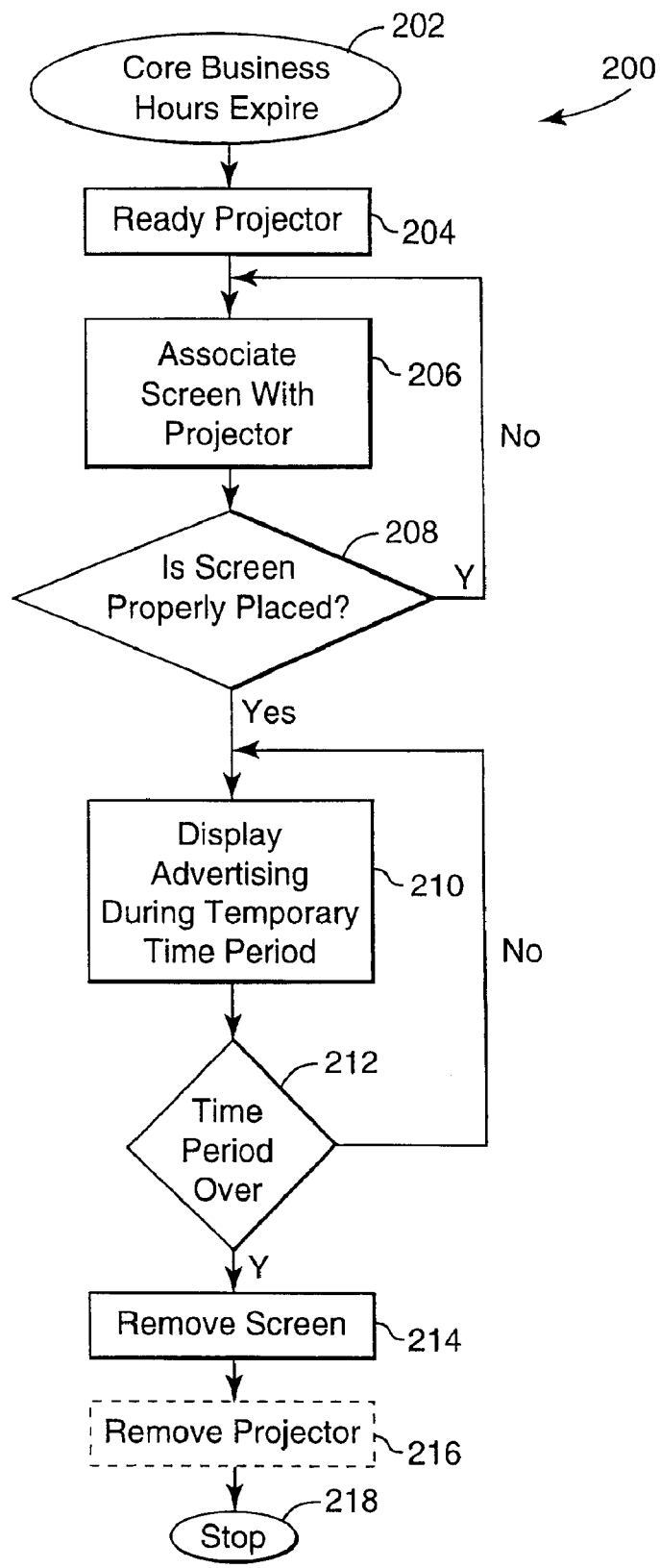
FIG. 16 is a flow chart of a method of advertising during non-core business hours according to another aspect of the present invention.

FIG. 16 illustrates another method according to the present invention. This method is particularly suitable for use at a business located where there is substantial traffic during non-core business hours. There are many businesses that operate during a portion of the day (e.g. mornings and early afternoons) and then close during other portions of a day (e.g. late afternoon and night). Banks, accounting firms, securities companies, financial institutions, law firms, and other businesses are typically open for business during mornings and afternoons, but are typically closed at night.

During operational or core business hours, these businesses may desire to have windows to offer sunlight access to employees and customers. In some countries, local regulations even require employee access to sunlight. Often these businesses are located in high traffic areas such as downtown areas near entertainment complexes and sporting arenas. After core business hours expire 202, the windows or doors of such businesses may be converted into advertising or promotional tools by use of the present invention. The business could advertise its own business or sell access to its windows and door for other advertisers.

The projector is readied in step 204. This step may be simply to turn on a pre-placed projector. This may be done manually or automatically by use of a computer system. Alternatively, a portable projector may be manually installed. A screen in associated with the projector in step 206. This may be accomplished by manually adhering a screen to a window or window frame. Alternatively, if a motorized window shade is used, a computer system may automatically lower the shade at a preselected time.

In step 208, a computer system or individual determines whether the screen is properly placed. For example, a magnet or hall sensor may be placed at the bottom of the screen and a sensor may be placed at the bottom of a window frame to determine when the screen of the type shown in FIG. 15A is unrolled. If a computer system is used, it can be programmed to keep the projector off until the screen is in place in order to prevent the projector's bright light from being inadvertently shined out a window without the intervening filter of the screen.

Once it is determined that the screen is in place, the projector may display the information in step 210. The information is displayed for a temporary time period in step 212. This can be for a certain or uncertain time period. For example, the system can be programmed to display the information until a set time (e.g. 2:00 a.m.) or a motion sensor may be placed outside the business. Once the foot traffic is below a predetermined threshold as evidenced by information from the motion sensor, the computer system may be programmed to shut off the projector. Once the time period is over, the screen is removed in step 214. If the projector is portable, it may be convenient to remove the projector 216 as well. At this point the method ends 218.

EXAMPLES

The invention is further illustrated by the following examples, but the particular materials and amounts thereof recited in these examples, as well as other conditions and details, should not be construed to unduly limit this invention.

Example 1

A monolayer glass beaded film similar to that shown in FIG. 15 B was provided. The film comprises a monolayer of glass bead of approximately 65 micrometers, an opaque black matrix (urethane and carbon black) and a polyvinyl chloride substrate. The beads had a refractive index of about 1.9. The film is generally available from Minnesota Mining and Manufacturing Company of St. Paul, Minn. under the name BePF 120 beaded film. The screen was attached to a glass window using Scotch Glue Stick Restickable Adhesive (3M catalog #6314) generally available from Minnesota Mining and Manufacturing Company of St. Paul, Minn. The film plus the adhesive was approximately 6 mils thick. The adhesive was not coated over the entire viewing surface of the screen. Instead, the adhesive was only placed on the four corners of the beaded film screen. The assembly provided a secure, releasable attachment to the window.

The assembly was coupled to a Toshiba LCD Data Projector, number TLP 710 and video was viewed through the window.

Example 2

Beaded Film Laminated to PVC Film

A monolayer glass beaded film similar to that described in Example 1 was provided. The film comprises a monolayer of glass bead of approximately 65 micrometers in diameter, an opaque black matrix (urethane and carbon black) and a polyvinyl chloride substrate. The film is generally available from Minnesota Mining and Manufacturing Company of St. Paul, Minn. under the name BePF 120 beaded film. A 10 mil thick plasticized PVC film (KGC193 Clear PVC Film from Achilles USA, Inc.) was laminated to the non-beaded side of the beaded film using the pressure sensitive adhesive 3M Opt-1 Laminating adhesive (also known as Bonding Systems Division 9483 adhesive) available from 3M. The screen was approximately 20 mils thick. This assembly was pressed against a glass window to provide a secure, releasable and reusable attachment of the screen to the window. The material is also believed to be washable.

Example 3

Beaded Film Laminated with Ethylene Vinyl Acetate

A monolayer glass beaded film similar to that described in Example 1 was provided. The film comprises a monolayer of glass bead of approximately 65 micrometers in diameter, an opaque black matrix (urethane and carbon black) and a polyvinyl chloride substrate. The film is generally available from Minnesota Mining and Manufacturing Company of St. Paul, Minn. under the name BePF 120 beaded film. An ethylene vinyl acetate film (EVA Elvax from Dupont, 5 mils thick) was laminated to the polyvinyl chloride substrate. No additional adhesive was needed to attach the BePF 120 to the EVA. The screen was approximately 11 mils thick. The assembly provided a secure, releasable and reusable attachment of the screen to the window. Adhesion by static cling is believed to hold the EVA film firmly to the BePF 120 and provides attachment of the assembly to the window. The material is also believed to be washable.

Example 4

Beaded Film with Water Based Adhesive

A monolayer glass beaded film similar to that described in Example 1 was provided. The film comprises a monolayer of glass bead of approximately 65 micrometers in diameter, an opaque black matrix (urethane and carbon black) and a polyvinyl chloride substrate. The film was approximately 6 mils thick and is generally available from Minnesota Mining and Manufacturing Company of St. Paul, Minn. under the name BePF 120 beaded film. A water based, water activated pressure sensitive adhesive (3M Latex PSA R55306) was provided according to the teachings described in U.S. Pat. No. 6,013,722. The adhesive was coated on the PVC substrate. Adhesion to the window is accomplished by first wetting the surface with water and moving the screen on the window surface and into the desired viewing position. The assembly provided a secure, releasable attachment of the screen to the window. It is also believed to be easy to apply and does not degrade the projected image.

Example 5

Beaded Film with Reusable Adhesive Covering Entire Surface

A monolayer glass beaded film similar to that described in Example 1 was provided. The screen comprises a monolayer of glass bead of approximately 65 micrometers in diameter, an opaque black matrix (urethane and carbon black) and a polyvinyl chloride substrate. The film is generally available from Minnesota Mining and Manufacturing Company of St. Paul, Minn. under the name BePF 120 beaded film. A low tack adhesive (3M 9661 PSA, which is a cross linked UCAR Latex 9168 adhesive available from Union Carbide Corporation) was coated over substantially all of the viewing surface of the BePF beaded film. The screen was then applied to the window using light pressure a secure, releasable and reusable attachment of the screen to the window was provided. The screen was approximately 25 mils thick.

In the above description, the position of elements has sometimes been described in terms of "upper", "front", "rear", "lower", "over", "under", "vertical", "horizontal", "top" and "bottom". These terms have been used merely to simplify the description of the various elements of the invention, such as those illustrated in the drawings. They should not be understood to place any limitations on the useful orientation of the elements of the present invention.

Accordingly, the present invention should not be considered limited to the particular examples described above, but rather should be understood to cover all aspects of the invention as fairly set out in the claims. Various modifications, equivalents, as well as numerous structures to which the present invention may be applicable will be readily apparent to those of skill in the art to which the present invention is directed upon review of the present specification. The claims are intended to cover such modifications and devices.

What is claimed is:

1. A method of displaying information to viewers comprising the steps of:

providing a projector capable of presenting an image, providing a flexible screen having a rear surface for receiving light from the projector, a viewing surface opposite the rear surface, and a light absorbing layer for rendering the screen substantially opaque in ambient lit conditions when no image is projected on the screen by the projector, providing a removable adhesive, selecting a substantially transparent surface in a position capable of being viewed;

adhering the screen on the substantially transparent surface with the removable adhesive, projecting an image from the projector onto the rear surface of the screen to provide the information to the viewers.

2. A method according to claim 1 further comprising the step of removing the screen from the substantially transparent surface after a time period.

3. A method according to claim 1 wherein the step of providing a removable adhesive comprises the step of providing a reusable adhesive and the method further comprises the steps of:

removing the screen from the substantially transparent surface after a time period, and adhering the screen to a different substantially transparent surface at a separate location.

4. A method according to claim 1 wherein the step of providing a flexible screen comprises the step of providing a non-holographic screen.

5. A method according to claim 1 wherein the step of providing a removable adhesive comprises the step of providing an optical adhesive.

6. A method according to claim 1 wherein the step of providing a flexible screen comprises the step of providing a screen having a plurality of refractive elements, a flexible light transmitting substrate, a light absorbing layer associated with the light transmitting substrate for controlling ambient light rejection so that the screen appears substantially dark when no light is projected onto the screen from the projector.

7. A method of displaying information to viewers comprising the steps of:

providing a projector capable of presenting an image, providing a non-holographic flexible screen having a rear surface for receiving light from the projector, and a viewing surface opposite the rear surface, providing a removable adhesive, selecting a substantially transparent surface in a position capable of being viewed, adhering the rear or viewing surface of the screen on the substantially transparent surface with the removable adhesive, and projecting an image from the projector onto the rear surface of the screen to provide the information to the viewers.

8. A method of displaying information to viewers comprising the steps of:

providing a projector capable of presenting an image, providing a flexible screen having a rear surface for receiving light from the projector, and a viewing surface opposite the rear surface, providing a cling material, selecting a substantially transparent surface in a position capable of being viewed, removably attaching the rear or viewing surface of the screen to the substantially transparent surface with the cling material, and projecting an image from the projector onto the rear surface of the screen to provide the information to the viewers.

9. A method of displaying information to viewers comprising the steps of:

providing a projector capable of presenting an image, providing a flexible screen having a rear surface for receiving light from the projector, a viewing surface opposite the rear surface, and a light absorbing layer for rendering the screen substantially opaque in ambient lit conditions when no image is projected on the screen by the projector providing a mechanical fastener, selecting a substantially transparent surface in a position capable of being viewed, removably associating the screen with the substantially transparent surface with the mechanical fastener, projecting an image from the projector onto the rear surface of the screen to provide the information to the viewers.

10. A method according to claim 9 wherein the step of providing a mechanical fastener comprises the step of providing a removable mechanical fastener.

11. A projection screen for use in an optical system having a projector that provides information to viewers, the projection screen comprising:

a flexible light transmitting substrate, light absorbing means associated with the light transmitting substrate for controlling ambient light rejection so that the screen appears substantially dark in ambient lit conditions when no light is projected on the screen from the projector, and a removable adhesive associated with the screen to releasably adhere the screen in a position associated with a substantially transparent surface so that viewers may view the screen through the substantially transparent surface.

12. A projection screen according to claim 11 wherein the screen includes a plurality of refractive elements.

13. A projection screen according to claim 12, wherein the plurality of refractive elements comprise glass beads.

14. A projection screen according to claim 11 wherein the removable adhesive is an optical adhesive.

15. A projection screen according to claim 14 wherein the optical adhesive is a repositionable adhesive.

16. A screen according to claim 11 wherein the screen is a disposable screen that is conformable to a substantially non-planar substrate.

17. A screen according to claim 11 wherein the screen may be readily manually cut to customize the shape of the screen.

18. A screen according to claim 11 wherein the screen includes a rear surface for receiving light from a the projector and a viewing surface opposite the front surface, and removable adhesive in situated on the viewing surface of the screen.

19. A screen according to claim 18 wherein the removable adhesive is situated on substantially the entire viewing surface of the screen.

20. A screen according to claim 11 further including a substantially opaque border.

21. A projection screen far use in arm optical system having a projector that provides information to viewers, the projection screen comprising:

a flexible light transmitting substrate, light absorbing means associated with the light transmitting substrate for controlling ambient light rejection so that the screen appears substantially dark when no light is projected on the screen from the projector, and a cling material associated with the screen to releasably attach the screen in a position associated with a substantially transparent surface so that viewers may view the screen through the substantially transparent surface.

22. A projection screen for use in an optical system having a projector that provides information to viewers, the projection screen comprising:

a plurality of glass beads, a flexible light transmitting substrate, light absorbing means associated with the light transmitting substrate for controlling ambient light rejection so that the screen appears substantially dark when no is projected on the screen from the projector, and a mechanical fastener associated with the screen to releasably attach the screen in a position associated with a substantially transparent surface so that viewers may view the screen through the substantially transparent surface.

23. A projection screen according to claim 22 wherein the mechanical fastener is a removable mechanical fastener.

24. An optical system comprising, in combination, a projector for presenting an image, a screen having a rear side for receiving light from the projector and a viewing side opposite the rear side, the screen adapted to receive an image from the projector from the rear side of the screen and present it to a viewer from the viewing side of the screen, the screen having light absorbing means for absorbing ambient light, and an adhesive associated with the screen for optically coupling the rear or viewing side of the screen to a substantially transparent window in a position capable of being viewed.

25. A system according to claim 24 wherein the screen comprises a front projection screen.

26. A system according to claim 24 wherein the adhesive is a removable adhesive.

27. A system according to claim 24 wherein the adhesive is a permanent adhesive.

28. A system according to claim 24 wherein the screen is flexible.

29. A system according to claim 24 wherein the screen is conformable.

30. A system according to claim 24 further including cutting means for cutting the screen to a customize shape.

31. A system according to claim 24 further including a roller for removing bubbles encountered during installation.

32. A system according to claim 24 wherein, the screen comprises a rear projection screen.

33. A projection screen comprising:

a first side and a second side, an array of refractive elements wherein said elements are substantially surrounded by an opaque matrix, said refractive elements exhibit a refractive index in the range of 1.4 to 2.0, said opaque matrix defining an army of apertures, said screen exhibiting a mechanical flexibility sufficient to allow it to be rolled up into a cylindrical roll having an inner diameter of 15.25 centimeters (6") or less, and an attachment member associated with at least one of said first and said second sides of said screen.

34. The screen of claim 33 wherein said refractive index is in the range of 1.5 to 1.8.

35. The screen of claim 33 wherein said refractive index is in the range of 1.6 to 1.7.

36. The screen of claim 33 wherein said attachment layer is selected from the group consisting of pressure sensitive adhesives, in situ cured adhesives, water activated adhesives, and cling materials.

37. The screen of claim 33 wherein the attachment member comprises mechanical fastening means.

38. The screen of claim 33 wherein said refractive elements comprise microspheres.

39. The screen of claim 33 wherein said refractive elements comprise glass beads.

40. A screen according to claim 33 wherein the ambient light contrast ratio of the screen is greater than 25.

* * * * *

UNITED STATES PATENT AND TRADEMARK OFFICE
CERTIFICATE OF CORRECTION

PATENT NO. : 6,870,670 B2
DATED : March 22, 2005
INVENTOR(S) : Gehring, Thomas R.

It is certified that error appears in the above-identified patent and that said Letters Patent is hereby corrected as shown below:

Column 4,
Line 22, after "invention" insert -- ; --.

Column 10,
Line 40, after "shift" insert -- (Attorney Docket No. 56078USA5A.002); Attorney Docket No. 56042USA1A.002, filed 3/30/01, --.

Column 11,
Line 53, delete "Ky." and insert -- KY, --, therefor.

Column 12,
Line 39, after "shift"" insert -- (Attorney Docket No. 56078USA5A.002) --.

Column 18
Line 46, delete "comers" and insert -- corners --, therefore

Column 20,
Line 32, delete "rcmovablc" and insert -- removable --, therefor.

Column 22,
Line 10, after "from" delete "a".
Line 12, delete "in" and insert -- is --, therefor.
Line 18, delete "far" and insert -- for --, therefor.
Line 18, delete "arm" and insert -- an --, therefor.
Line 38, after "no" insert -- light --.

UNITED STATES PATENT AND TRADEMARK OFFICE
CERTIFICATE OF CORRECTION

PATENT NO. : 6,870,670 B2
DATED : March 22, 2005
INVENTOR(S) : Gehring, Thomas R.

It is certified that error appears in the above-identified patent and that said Letters Patent is hereby corrected as shown below:

Column 23,
Line 7, after "wherein" delete ",".
Line 16, delete "army" and insert -- array --, therefor.

Signed and Sealed this

Twelfth Day of July, 2005

JON W. DUDAS
*Director of the United States Patent and Trademark Office*